US011615693B2

United States Patent
Hunter, Jr.

(10) Patent No.: US 11,615,693 B2
(45) Date of Patent: *Mar. 28, 2023

(54) VEHICLE SAFETY SYSTEM FOR PREVENTING CHILD ABANDONMENT AND RELATED METHODS

(71) Applicant: LICEC LLC, Apopka, FL (US)

(72) Inventor: Cecil Lee Hunter, Jr., Apopka, FL (US)

(73) Assignee: LICEC LLC, Apopka, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/446,334

(22) Filed: Aug. 30, 2021

(65) Prior Publication Data

US 2022/0020262 A1 Jan. 20, 2022

Related U.S. Application Data

(63) Continuation of application No. 17/111,821, filed on Dec. 4, 2020, now Pat. No. 11,170,631, which is a continuation of application No. 16/600,829, filed on Oct. 14, 2019, now Pat. No. 10,885,765, which is a continuation-in-part of application No. 15/469,354, filed on Mar. 24, 2017, now abandoned.

(60) Provisional application No. 62/348,964, filed on Jun. 12, 2016, provisional application No. 62/317,587, filed on Apr. 3, 2016.

(51) Int. Cl.
| | |
|---|---|
| *G08B 21/24* | (2006.01) |
| *G08B 21/02* | (2006.01) |
| *B60K 15/03* | (2006.01) |
| *B60N 2/00* | (2006.01) |

(52) U.S. Cl.
CPC .............. *G08B 21/24* (2013.01); *B60K 15/03* (2013.01); *B60N 2/002* (2013.01); *G08B 21/02* (2013.01); *B60K 2015/0323* (2013.01)

(58) Field of Classification Search
CPC ........ G08B 21/24; G08B 21/02; B60K 15/03; B60N 2/002
See application file for complete search history.

(56) References Cited

U.S. PATENT DOCUMENTS

| | | | |
|---|---|---|---|
| 6,104,293 | A | 8/2000 | Rossi |
| 6,922,622 | B2 | 7/2005 | Dulin et al. |
| 7,170,401 | B1 | 1/2007 | Cole |
| 7,466,217 | B1 | 12/2008 | Johnson et al. |
| 7,830,270 | B1 | 11/2010 | Philbert |
| 8,289,145 | B2 | 10/2012 | Miller et al. |
| 8,534,397 | B2 | 9/2013 | Grajkowski et al. |

(Continued)

*Primary Examiner* — Albert K Wong
(74) *Attorney, Agent, or Firm* — Allen, Dyer, Doppelt + Gilchrist, PA

(57) ABSTRACT

A vehicle safety system is for preventing child abandonment in a vehicle. The vehicle safety system may include a controller coupled to a flow sensor, a temperature sensor, and a seat sensor. The controller may be configured to detect when the vehicle is in a fueling state based upon the flow sensor, detect occupancy of a child safety seat based upon the seat sensor, and detect when a driver side door is in an open state based upon a driver side door sensor in the vehicle. The controller may be configured to when the driver side door has entered the open state, when the child safety seat is occupied, and when the vehicle does not enter the fueling state within a time period, then cause the vehicle to enter an alert state.

20 Claims, 27 Drawing Sheets

(56) References Cited

U.S. PATENT DOCUMENTS

| | | |
|---|---|---|
| 8,810,384 B1 | 8/2014 | Bowman |
| 8,816,845 B2 | 8/2014 | Hoover et al. |
| 8,831,824 B2 | 9/2014 | Moinzadeh et al. |
| 8,941,499 B2 | 1/2015 | Fung et al. |
| 9,000,907 B1 | 4/2015 | Rembach et al. |
| 9,008,854 B2 | 4/2015 | Breed |
| 9,434,275 B2 | 9/2016 | Maley |
| 9,457,689 B2 | 10/2016 | Stefan et al. |
| 9,457,716 B2 | 10/2016 | Westmoreland |
| 10,161,401 B2 | 12/2018 | Kim et al. |
| 10,202,119 B2 | 2/2019 | Bassindale |
| 10,211,990 B2 | 2/2019 | Nairn et al. |
| 10,240,542 B1 | 3/2019 | Salter et al. |
| 10,242,509 B2 | 3/2019 | Throop et al. |
| 10,885,765 B2 | 1/2021 | Hunter, Jr. |
| 11,170,631 B2 * | 11/2021 | Hunter, Jr. ............ G08B 29/188 |
| 2005/0068162 A1 | 3/2005 | Santa Cruz et al. |
| 2005/0225440 A1 | 10/2005 | Simmons et al. |
| 2006/0044126 A1 | 3/2006 | Ho et al. |
| 2006/0044127 A1 | 3/2006 | Ho et al. |
| 2008/0001730 A1 | 1/2008 | Barton et al. |
| 2009/0237229 A1 | 9/2009 | Kautz |
| 2011/0074565 A1 | 3/2011 | Cuddihy et al. |
| 2012/0119896 A1 | 5/2012 | Lam et al. |
| 2012/0154136 A1 | 6/2012 | Connelly, Jr. |
| 2012/0232749 A1 | 9/2012 | Schoenberg et al. |
| 2012/0268265 A1 | 10/2012 | Morley et al. |
| 2013/0049947 A1 | 2/2013 | Lanter |
| 2013/0194089 A1 | 8/2013 | Estrada |
| 2014/0043155 A1 | 2/2014 | Shaw |
| 2014/0077943 A1 | 3/2014 | Bloukos et al. |
| 2014/0184404 A1 | 7/2014 | Schoenberg et al. |
| 2014/0306817 A1 | 10/2014 | Ricci |
| 2015/0137962 A1 | 5/2015 | Binnicker |
| 2016/0031342 A1 | 2/2016 | Camello et al. |
| 2016/0042624 A1 | 2/2016 | Quave |
| 2016/0114650 A1 | 4/2016 | Kwark |
| 2016/0121848 A1 | 5/2016 | Seibert |
| 2016/0176265 A1 | 6/2016 | Rolka |
| 2016/0193960 A1 | 7/2016 | Barabas et al. |
| 2016/0210833 A1 | 7/2016 | Pinder |
| 2016/0272150 A1 | 9/2016 | Doshi et al. |
| 2016/0280067 A1 | 9/2016 | Cuddihy et al. |
| 2016/0379466 A1 | 12/2016 | Payant et al. |
| 2017/0109987 A1 | 4/2017 | Auvenshine et al. |
| 2017/0154513 A1 | 6/2017 | Hariri |
| 2018/0025604 A1 | 1/2018 | Protopsaltis et al. |
| 2018/0272894 A1 | 9/2018 | Logan |
| 2018/0370431 A1 | 12/2018 | Wincek |
| 2020/0334453 A1 | 10/2020 | Thomas et al. |
| 2021/0146803 A1 | 5/2021 | Wu |

* cited by examiner

COMPONENTS OF CVAPS

VEHICLE SAFETY SYSTEM FOR PREVENTING CHILD ABANDONMENT AND RELATED METHODS

RELATED APPLICATION

This application is a continuation of application Ser. No. 17/111,821 filed on Dec. 4, 2020, which is a continuation of application Ser. No. 16/600,829 filed on Oct. 14, 2019, which is a continuation-in-part of prior filed copending application Ser. No. 15/469,354 filed Mar. 24, 2017, which claimed priority to Application No. 62/348,964 filed Jun. 12, 2016, and Application No. 62/317,587 filed Apr. 3, 2016, the entire subject matter of these applications is incorporated herein by reference in its entirety.

TECHNICAL FIELD

The present disclosure relates to the field of automotive systems, and, more particularly, to automotive safety systems and related methods.

BACKGROUND

Since 1998, an average of 37 kids per year (one every 9 days) has died of heat stroke due to being left in vehicles with the highest number of fatalities for a one-year time period being in 2010 with 49 deaths. From 1990-2015, child vehicular heat stroke deaths total 755. It is easy to place a child in a vehicle and head off to work via the daycare, but forget a child is onboard if the infant/child falls asleep during the commute or the driver is distracted.

In some approaches to this problem, the systems include temperature sensors as the source to provoke the system to alarm. Some of these approaches do not incorporate a driver exit alert and allow a driver to leave the vehicle with the child left inside. Those that do offer an exit alert suggest after a certain amount of time has lapsed and the temperature had reached a certain threshold, the vehicle alarm system would be triggered to alert of the situation. Some approaches generate an alarm when temperature reaches a certain point and when motion is detected as well. Some approaches have removable sensors that in the long run could possibly be damaged or lost, and some approaches allow the driver to turn the systems off.

Moreover, some approaches intermittently monitor throughout driving, and other approaches include complex receiver units adjacent to the vehicle belt buckle. If this receiver unit is out of alignment or blocked, the driver wouldn't get any alerts. Some approaches use different colored flashing lights for alerting the driver of issues. The disclosed approaches may have drawbacks; the drawbacks include gaps and lapses in their security features.

SUMMARY

Generally, a vehicle safety system is for preventing child abandonment in a vehicle. The vehicle safety system may include a flow sensor for fuel in the vehicle, a temperature sensor configured to generate a temperature value for an interior of the vehicle, at least one seat sensor respectively associated with at least one child safety seat within the vehicle, and a controller coupled to the flow sensor, the temperature sensor, and the at least one seat sensor. The controller may be configured to detect when the vehicle is in a fueling state based upon the flow sensor, detect occupancy of the at least one child safety seat based upon the at least one seat sensor, and detect when a driver side door is in an open state based upon a driver side door sensor in the vehicle. The controller may be configured to when the driver side door has entered the open state, when the at least one child safety seat is occupied, and when the vehicle does not enter the fueling state within a time period, then cause the vehicle to enter an alert state, and when in the alert state and when the temperature value passes a threshold temperature, cause an air conditioning device (e.g. air heating or air cooling device) of the vehicle to activate. Moreover, while in the alert state, the controller may be configured to cause an audio output of the vehicle to actuate periodically, or to actuate continuously.

In some embodiments, the vehicle safety system may also include a radio frequency identification (RFID) device reader within the vehicle and coupled to the controller. The controller may be configured to determine when an RFID tag associated with a pet is within the vehicle. The controller may be configured to, when the pet is detected within the vehicle, if the vehicle does not enter the fueling state within the time period, then cause the vehicle to enter the alert state.

Also, the vehicle safety system may also include at least one infrared (IR) proximity sensor in the vehicle and coupled to the controller. The controller may be configured detect occupancy of the vehicle based upon the at least one IR proximity sensor. The vehicle safety system may comprise a wireless receiver coupled to the controller, and a wireless transmitter key fob remote device in communication with the controller via the wireless receiver. The controller may be configured to exit the alert state based upon input received from the wireless transmitter key fob remote device.

The vehicle safety system may further include a cellular transceiver coupled to the controller. The controller may be configured to transmit an alert message via the cellular transceiver when in the alert state. Each seat sensor may include a first weight sensor embedded in a seat of the vehicle, and a second sensor coupled to a seat belt buckle receptacle and configured to determine when the seat belt buckle receptacle is in a latched state.

Another aspect is directed to a vehicle with a vehicle safety system for preventing child abandonment in a vehicle. The vehicle may include a vehicle frame, a flow sensor carried by the vehicle frame and being for fuel in the vehicle, a temperature sensor carried by the vehicle frame and configured to generate a temperature value for an interior of the vehicle, at least one seat sensor respectively associated with at least one child safety seat within the vehicle, and a controller carried by the vehicle frame and coupled to the flow sensor, the temperature sensor, and the at least one seat sensor. The controller may be configured to detect when the vehicle is in a fueling state based upon the flow sensor, detect occupancy of the at least one child safety seat based upon the at least one seat sensor, and detect when a driver side door is in an open state based upon a driver side door sensor in the vehicle. The controller may be configured to when receiving fueling user input from a user menu within the vehicle, when the at least one child safety seat is occupied, and when the vehicle does not enter the fueling state within a time period, then cause the vehicle to enter an alert state, and when in the alert state and when the temperature value passes a threshold temperature, cause an air conditioning device of the vehicle to activate.

Yet another aspect is directed to a method for installing a vehicle safety system for preventing child abandonment in a vehicle. The method may include positioning a flow sensor for fuel in the vehicle, positioning at least one seat sensor respectively associated with at least one child safety seat within the vehicle, and coupling a controller to the flow sensor and the at least one seat sensor. The controller may be configured to detect when the vehicle is in a fueling state based upon the flow sensor, detect occupancy of the at least one child safety seat based upon the at least one seat sensor, and detect when a driver side door is in an open state based upon a driver side door sensor in the vehicle. The controller may be configured to when the driver side door has entered the open state, when the at least one child safety seat is occupied, and when the vehicle does not enter the fueling state within a time period, then cause the vehicle to enter an alert state, and when in the alert state and when a temperature value for an interior of the vehicle passes a threshold temperature, cause an air conditioning device of the vehicle to activate.

DETAILED DESCRIPTION

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout, and prime notation is used to indicate similar elements in alternative embodiments.

This child vehicular abandonment prevention system seeks to address heat stroke deaths and abandonment of children and pets in vehicles. The system includes an Electronic Control Module/Electronic Control Unit (ECM/ECU) comprising firmware, a CPU and the associated circuitry (FIG. 13) capable of carrying out program instructions to implement, control and communicate with native vehicle components and the essential constituents. The ECM/ECU will monitor, command and control the entire system. A number of vehicle functions, such as the antilock braking system (ABS) speed sensors, interior display screen, vehicle interior speakers, door locks, power windows, the vehicles' alarm system, A/C and heat, ignition, door ajar and seat weight sensor will connect to the ECM/ECU through an aftermarket wire or pre-wired (i.e. an original equipment manufacturer (OEM) wire harness) harness which would be separate from the vehicles' wiring for the purpose of the lessor the integration the easier to diagnose problems that may arise and would be powered by vehicle electrical system.

Other constituents that will connect the ECM/ECU to assist in protecting a caregiver most precious cargo are, the child seat, wearable wireless thermometer patch, fob key, a flow (ultra) sensor/meter, temperature sensor, passive infrared sensors (PIR), alarm voice module, an International Standards Organization (ISO) pet microchip reader, wireless antenna (wireless child seat connectivity), the capability to call 911 and text message logged love ones when secure mode is activated, a hardwired harness (bridges the ECM/ECU and child seat via the rear redesigned seatbelt buckles) and redesigned seatbelt buckles that allow plug-in access to the hardwired harness for the child/infant seats and child/infant seats that continuously monitors throughout driving.

In one approach disclosed in U.S. Patent Application Publication No. 2014/0121557 to Gannon et al., a wearable wireless thermometer patch is adhered to a person's forehead and provides for a current body temperature, which would be displayed live over the vehicle display screen offering a caregiver constant intelligence about their sick child.

Figure 1A:
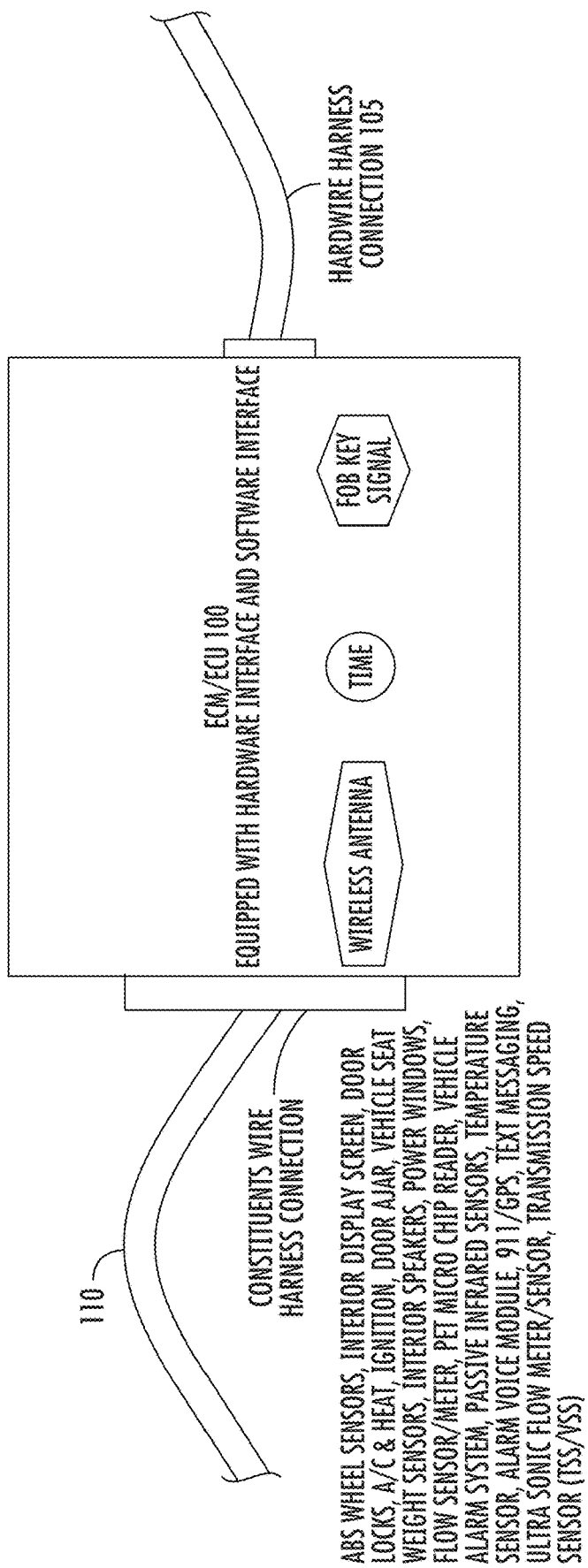
FIG. 1A is a schematic top view of the ECM/ECU with the hardwired harness connection connecting on the right side and the constituents connecting on the left side, according to the present disclosure.
Figure 1B:
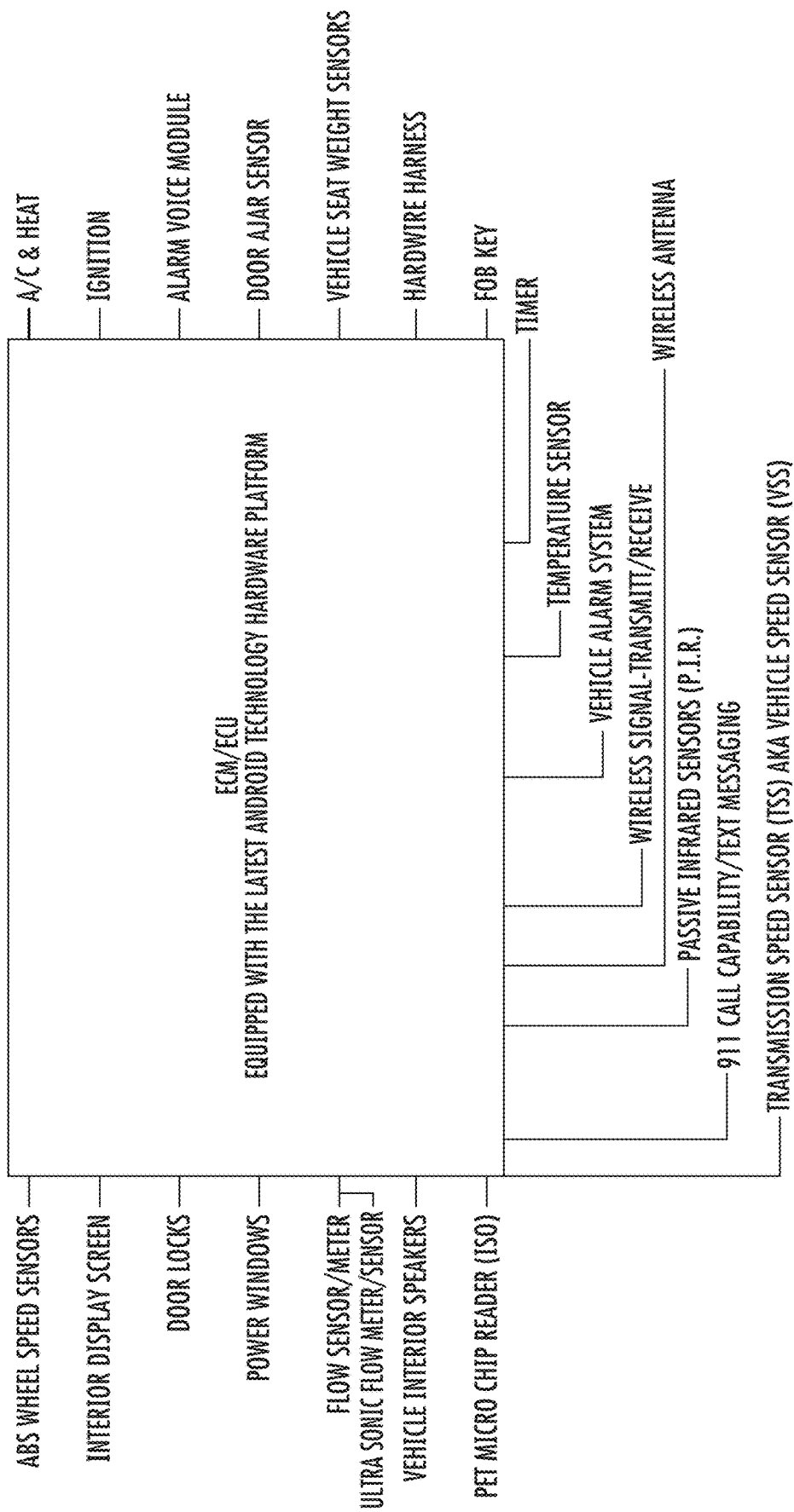
FIG. 1B is a schematic diagram of an individual breakdown of components connecting to the ECM/ECU, according to the present disclosure.
Figure 2A:
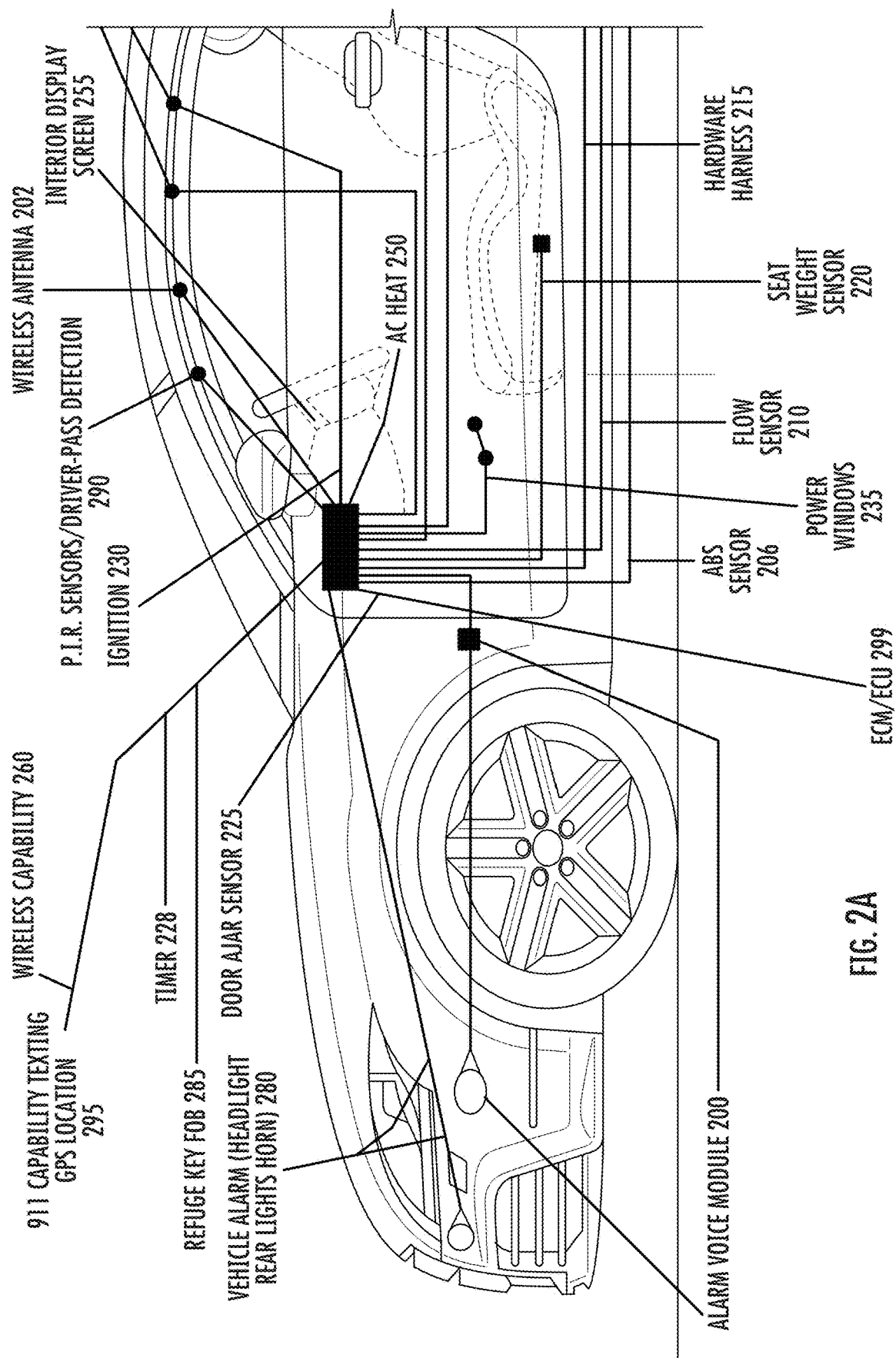
FIGS. 2A and 2B is a schematic cut out view of a vehicle, according to the present disclosure.
Figure 2B:
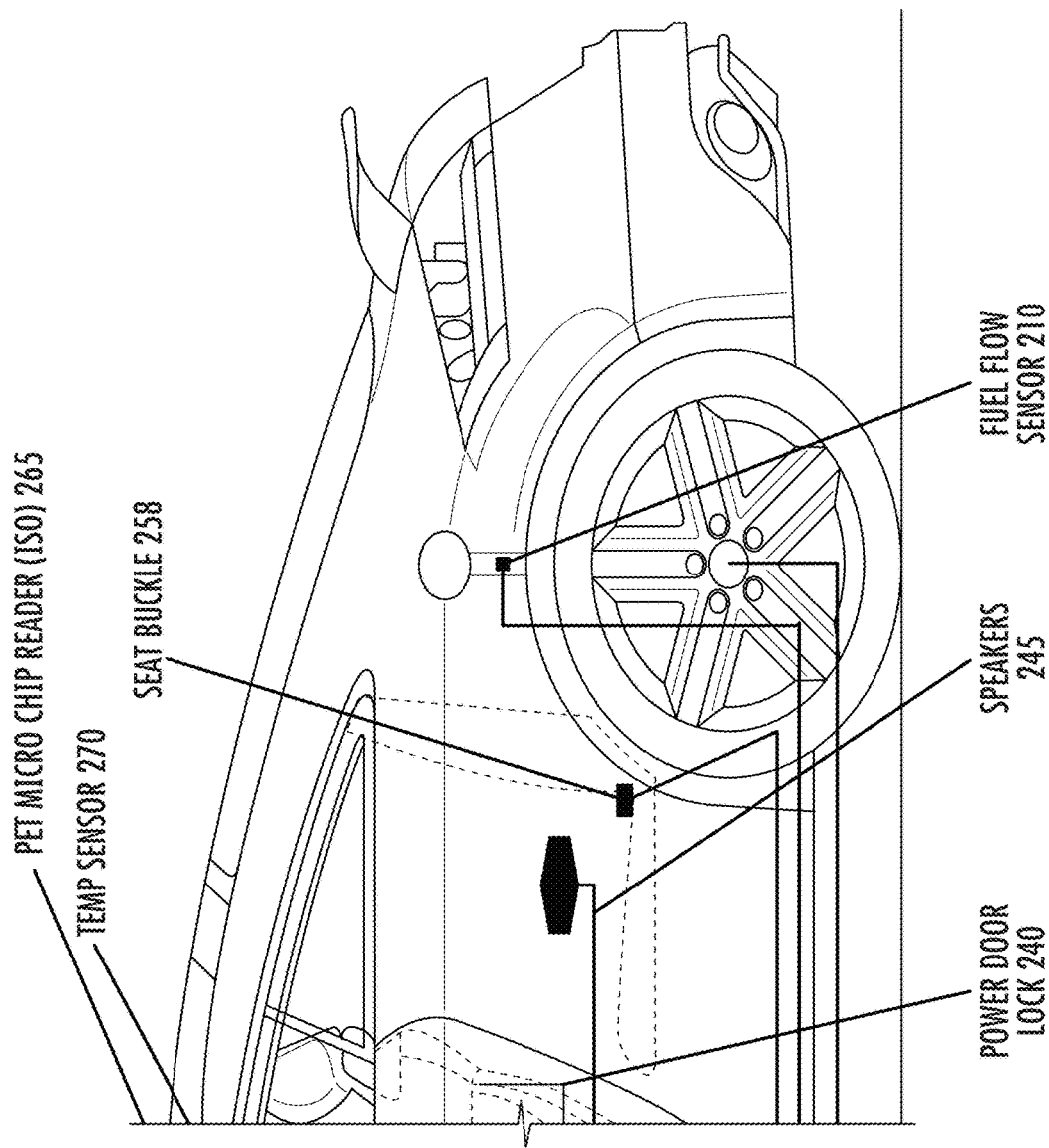
Figure 7A:
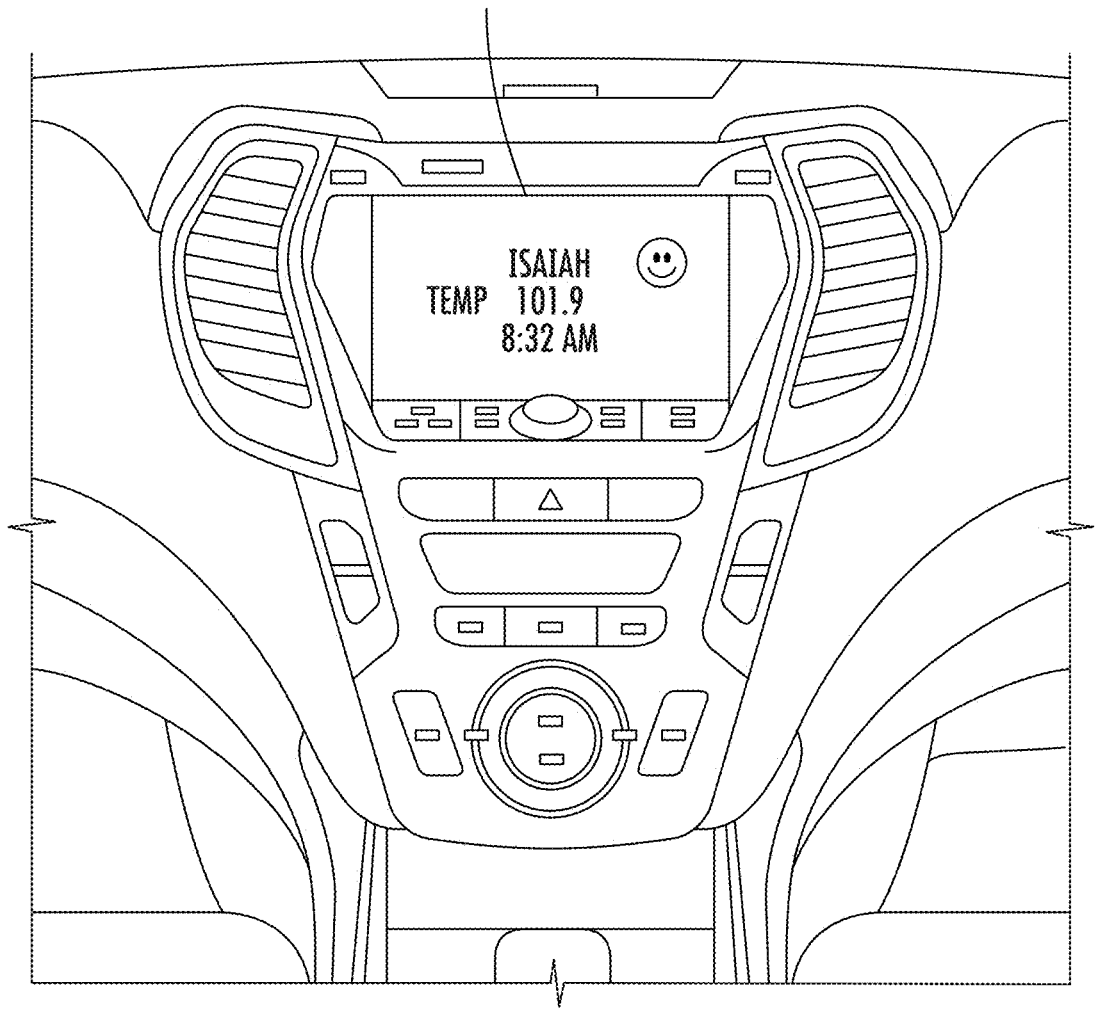
FIG. 7A is a schematic diagram of the interior display screen displaying a logged child's name, picture and child's temperature live onto the vehicle display screen, according to the present disclosure.
Figure 7B:
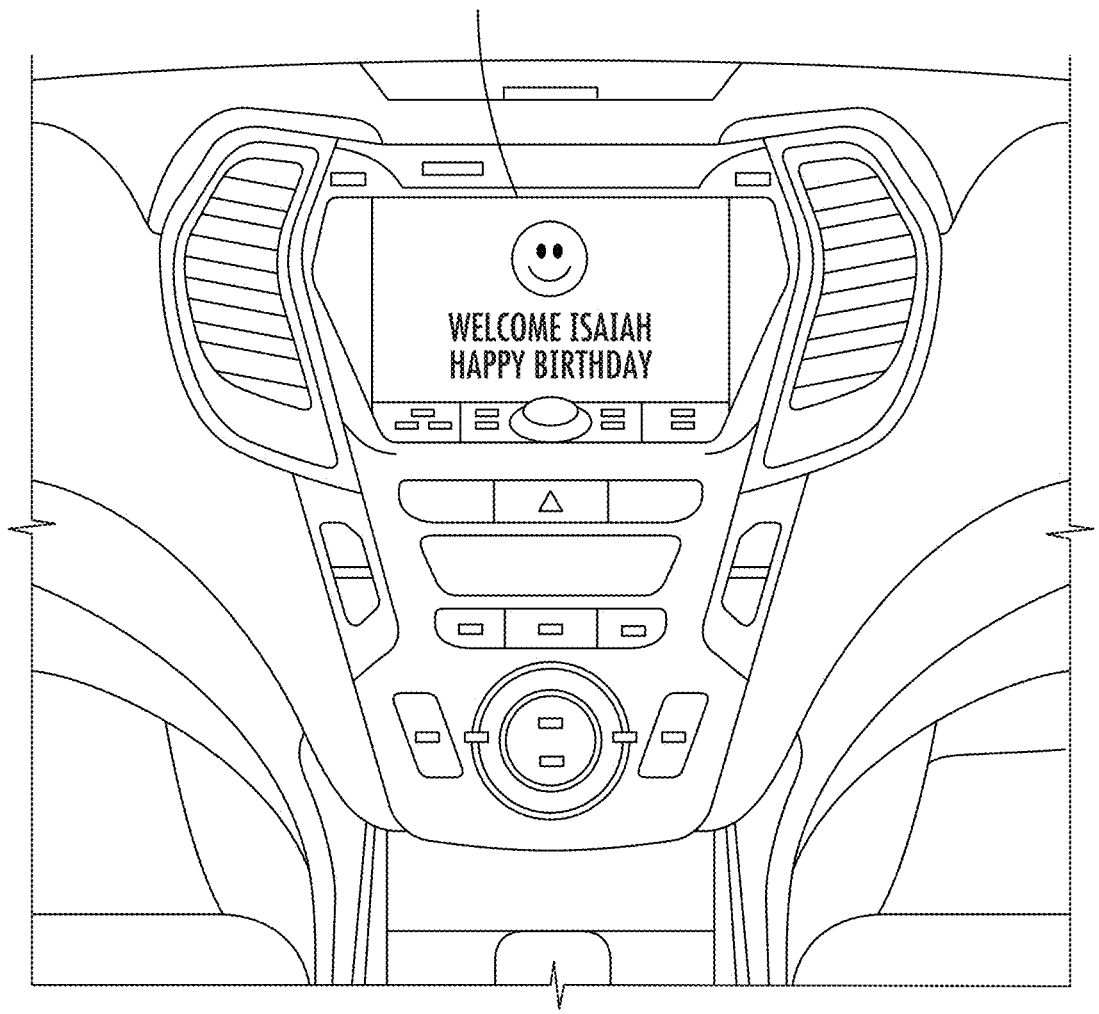
FIG. 7B is a schematic diagram of a logged child (name and photo) being welcomed into the vehicle and a happy birthday greeting once being placed into "their" child seat or infant carrier has been brought onboard, according to the present disclosure.

Referring initially to FIGS. 1A-2, a system includes an ECM/ECU 100. FIG. 1A with the hardwired harness connection 105 on the right side and the constituents wire harness connecting 110 on the left side. The ECM/ECU 100 FIGS. 1, 1B & FIGS. 2A-2B, 299 will be the controlling entity of the system. It is the electronic circuitry that carries out the instructions by performing the basic arithmetic, logical, control and input/output (I/O) operations specified by the instructions. It'll direct operation of the processor. It tells the computer's memory, arithmetic/logic unit and input/output (I/O) devices how to respond to a program's instructions. The vehicle auxiliary wiring would connect to it; it would not be wired into the vehicle wiring nor would the host vehicle computer control any functions of the system or ECM/ECU FIGS. 1, 1B & FIGS. 2A-2B, 299. The lessor the integration, the easier it is to diagnose any issues that may arrive. The ECM/ECU FIGS. 1, 1B & FIGS. 2A-2B, 299 will allow access to download events of alarming, for the reason of authoritative investigations. Equipped with the latest hardware interface and software interface FIG. 1A, 100 for interfacing and uploading information by vehicle owner such as names of kids and pets, pictures of kids and pets, birthdays or special events of kids and pets which would be displayed over the vehicle's display screen FIG. 7A and announced over the vehicle's speakers FIGS. 2A-2B, 245 once the child is placed in their assigned seat or a pet comes on board allowing the ISO pet microchip reader FIGS. 2A-2B, 265 to read the pets' chip. With wireless capability FIGS. 2A-2B, 260 and hardware interface and software interface, will allow the ECM/ECU FIGS. 1, 1B & FIGS. 2A-2B, 299 to display the child's temperature FIG. 7, 700 on the vehicle display screen FIG. 7D, 100 through the wearable wireless thermometer disclosed in U.S. Patent Application Publication No. 2014/0121557 to Gannon et al. The ECM/ECU FIGS. 1, 1B & FIGS. 2A-2B, 299 will also allow upload of the caregiver and loved one's cell phone numbers for text message alert if system is triggered into secure mode FIGS. 2A-2B, 200, 280, 295, 230, 240, 235, 250 & 270.

FIG. 1B depicts an individual breakdown of all the constituents that would connect to the ECM/ECU FIGS. 1, 1B & FIGS. 2A-2B, 299 and its capabilities such as 911 call/text message logged love ones FIGS. 2A-2B, 295 and wireless reception/transmission FIGS. 2A-2B, 260.

FIGS. 2A-2B depict a cut out view of a vehicle for optic of all constituents 200-299 and their positions and relationship to and in the vehicle.

Figure 3A:
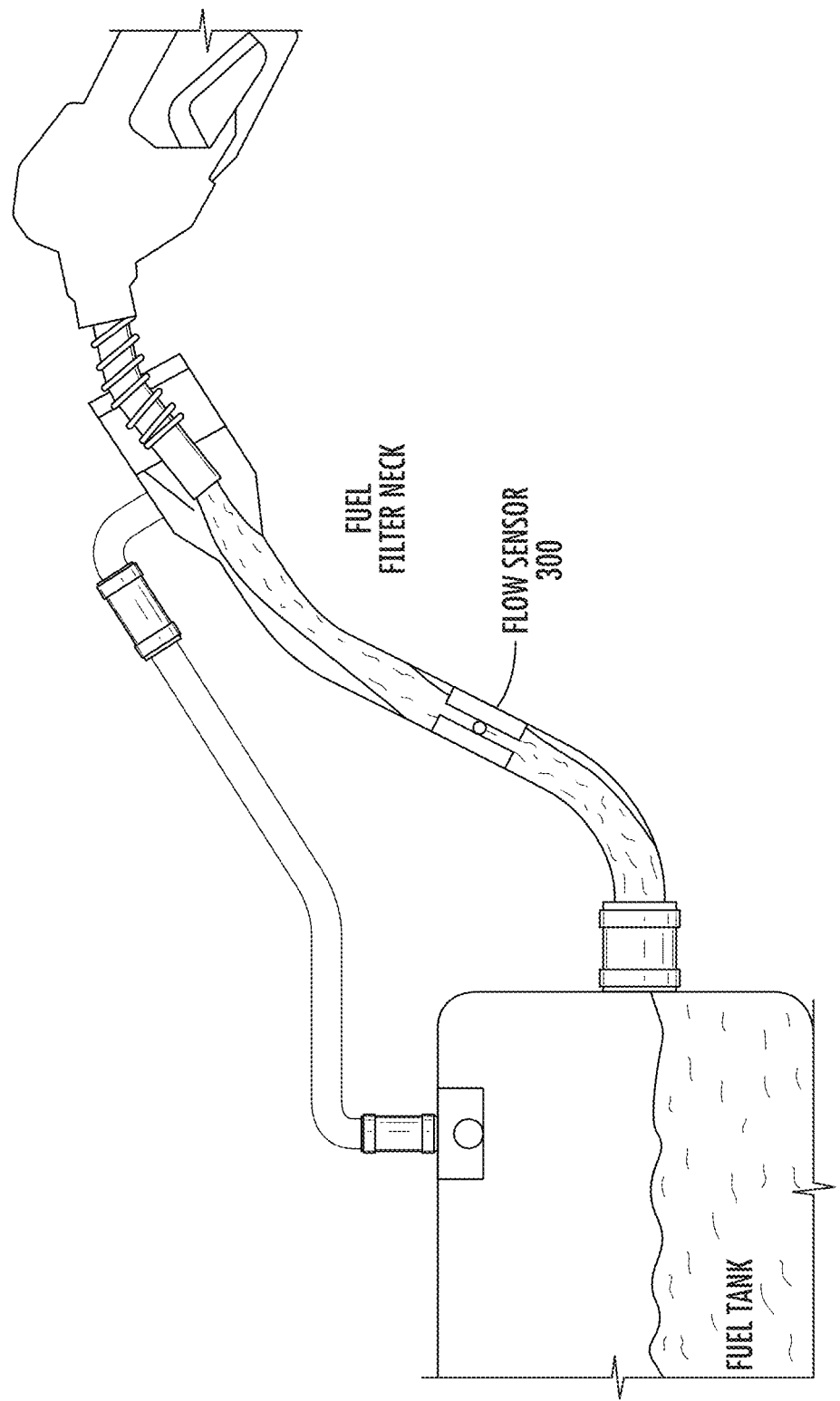
FIGS. 3A and 3B are schematic diagrams of the fuel filler neck in the vehicle, according to the present disclosure.
Figure 3B:
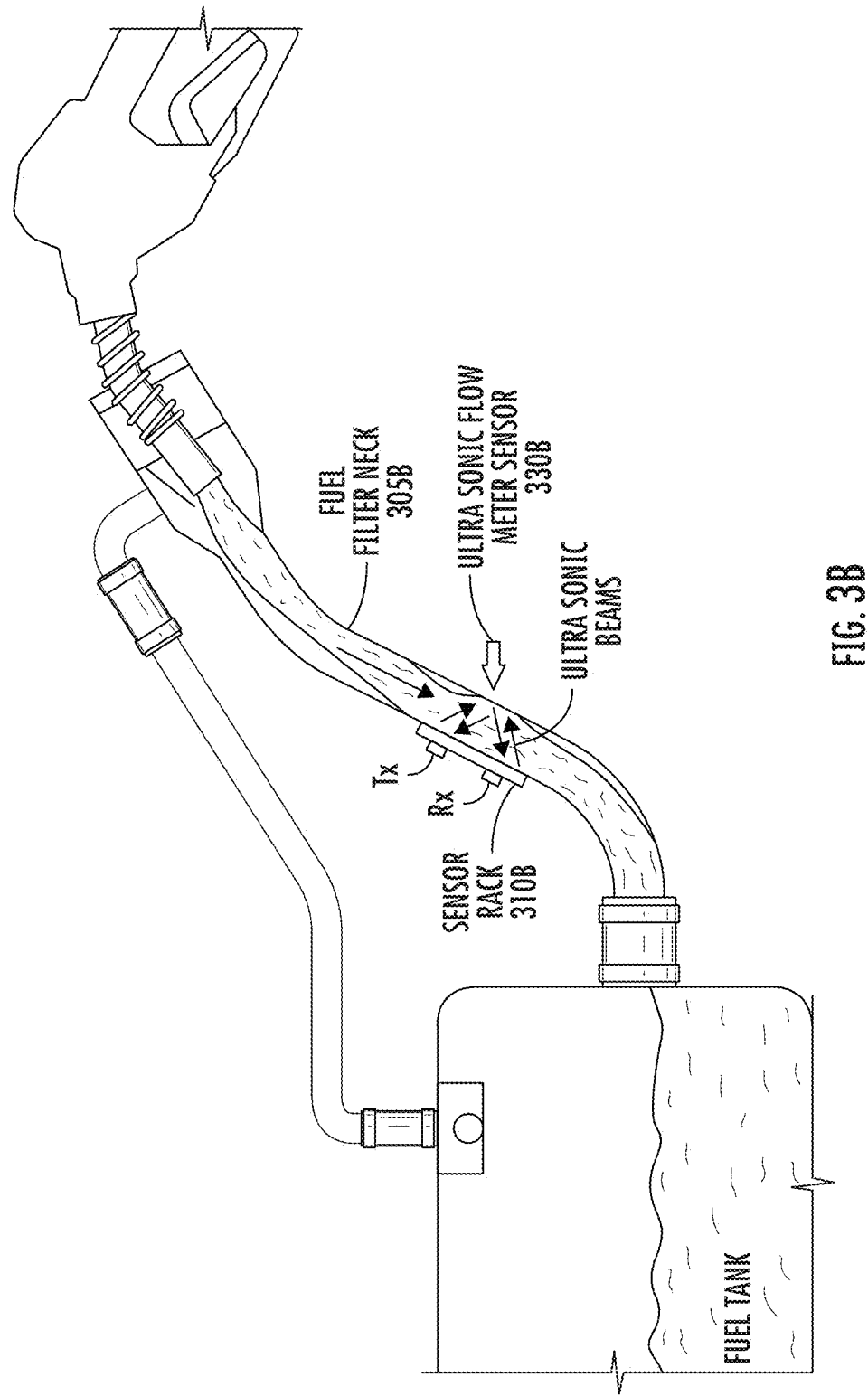

FIGS. 3A & 3B. FIG. 3A depicts the position of a flow meter/sensor 300 within the fuel filler neck FIG. 3B, 305B & FIG. 3: FIG. 3B depicts the position of an Ultra Sonic flow meter/sensor 330B positioned outside onto the fuel filler neck FIG. 3B, 305B. The flow meter/sensor FIG. 3A, 300 would be constructed in the fuel filler neck whereas FIG. 3B, 330B would be constructed outside of the fuel filler neck FIG. 3B, 305B of a vehicle to detect fuel flow. A vehicle could be equipped with either type. If a driver and child had to refuel, the driver would go to the vehicle display screen FIG. 7E, 100 and engage the refueling button FIG. 7D. It will allow the driver to exit the vehicle, removing weight from the seat weight sensor FIGS. 2A-2B, 220 without the verbal interior message alarming over the vehicle interior speakers FIGS. 2A-2B, 245 or the vehicle going into secure mode FIGS. 2A-2B, 200, 280, 295, 230, 240, 235, 250 & 270. The ECM/ECU timer FIG. 1A, 100 will allow 3 minutes to start fueling the vehicle. If fueling doesn't start within 3 minutes, the system would trigger the vehicle horn to sound intermittently for 1 minute before going into secure mode FIGS. 2A-2B, 200, 280, 295, 230, 240, 235, 250 & 270 believing the child has been abandoned. The 1 minute is to alert the driver and or that time has expired before going into full secure mode FIGS. 2A-2B, 200, 280, 295, 230, 240, 235, 250 & 270 which in addition to the vehicle intermittent horn sounding, the vehicle alarm, the alarm voice module, power door locks locking, ignition starting vehicle, elevating windows, temperature sensor determining A/C or heat, A/C or heat being turned on, text message a logged love one and dialing 911 and GPS location at 10 minutes of alarming. While alarming "during" the 1 minute intermittent horn sounding, before going into secure mode FIGS. 2A-2B, 200, 280, 295, 230, 240, 235, 250 & 270, driver would still be able to start refueling thwarting system from going into secure mode FIGS. 2A-2B, 200, 280, 295, 230, 240, 235, 250 & 270.

Once the flow sensor FIG. 3A, 300 & FIG. 3B, 305B detects flow, it would alert the ECM/ECU FIGS. 1A, 1B & FIGS. 2A-2B, 299 to cease the vehicle alarm FIGS. 2A-2B, 280 and thwart the system from going into secure mode FIGS. 2A-2B, 200, 280, 295, 230, 240, 235, 250 & 270. Once the driver has finished fueling and the flow sensor FIG. 3A, 300 & FIG. 3B, 305B doesn't detect flow, the flow sensor FIG. 3A, 300 & FIG. 3B, 305B would signal the ECM/ECU FIGS. 1A, 1B & FIGS. 2A-2B, 299 to restart the 3-minute grace period to allow the caregiver to reoccupy the vehicle and sit in a weight sensor seat FIGS. 2A-2B, 220 which would thwart alarming. If the caregiver doesn't reoccupy the vehicle before the 3 minutes expire, the invention would trigger the vehicle horn to sound intermittently for 1 minute before going into secure mode FIGS. 2A-2B, 200, 280, 295, 230, 240, 235, 250 & 270 believing the child has been abandoned. The 1 minute is to alert the driver and or that time has expired before going into full secure mode FIGS. 2A-2B, 200, 280, 295, 230, 240, 235, 250 & 270 which in addition to the vehicle intermittent horn sounding, the vehicle alarm, the alarm voice module, power door locks locking, ignition starting vehicle, elevating windows, temperature sensor determining A/C or heat, A/C or heat being turned on, text message a logged love one and dialing 911 and GPS location at 10 minutes of alarming.

Figure 7C:
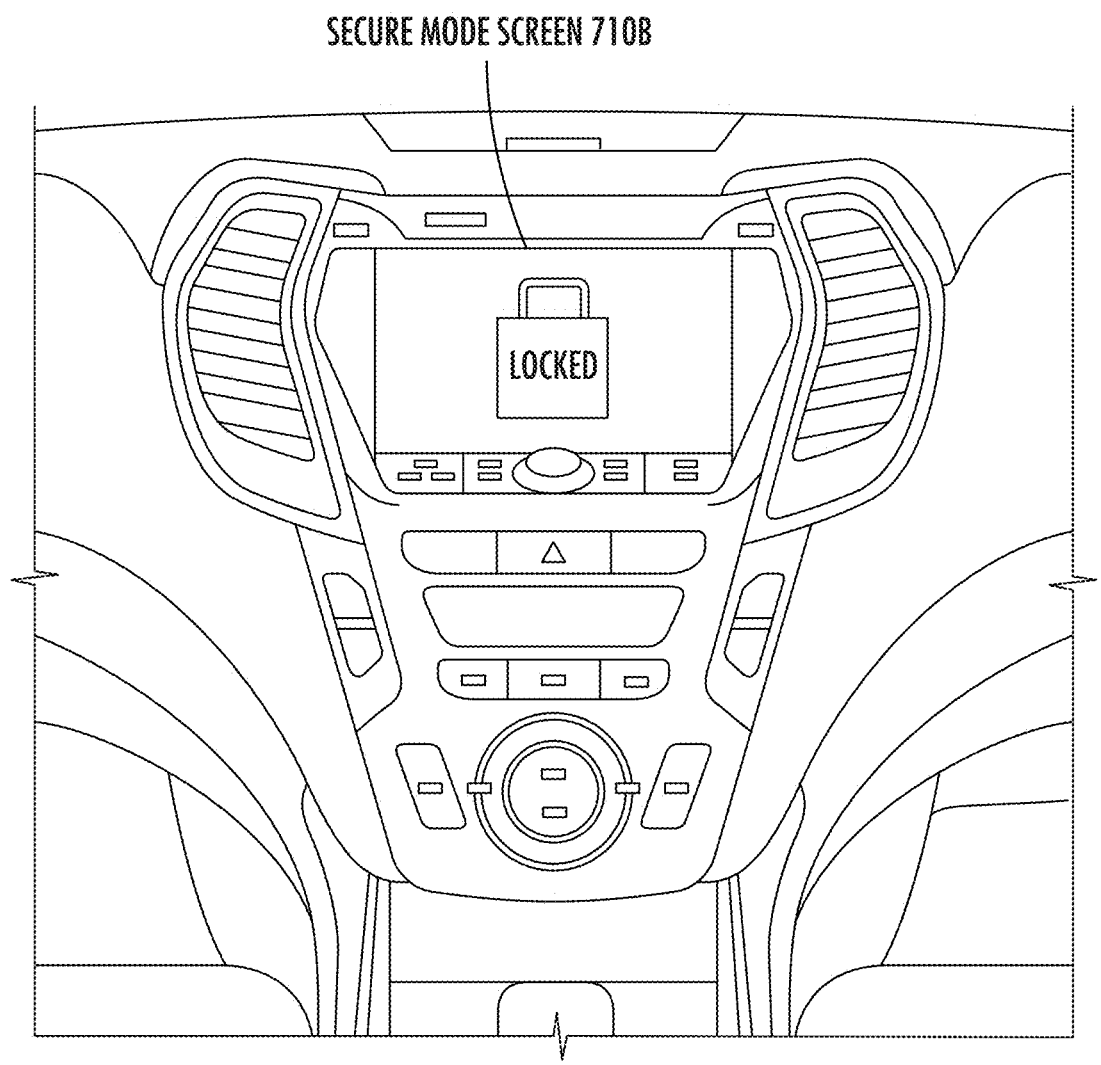
FIG. 7C is a schematic diagram of the interior display screen expressing the system is locked due to being in secure mode, according to the present disclosure.
Figure 7D:
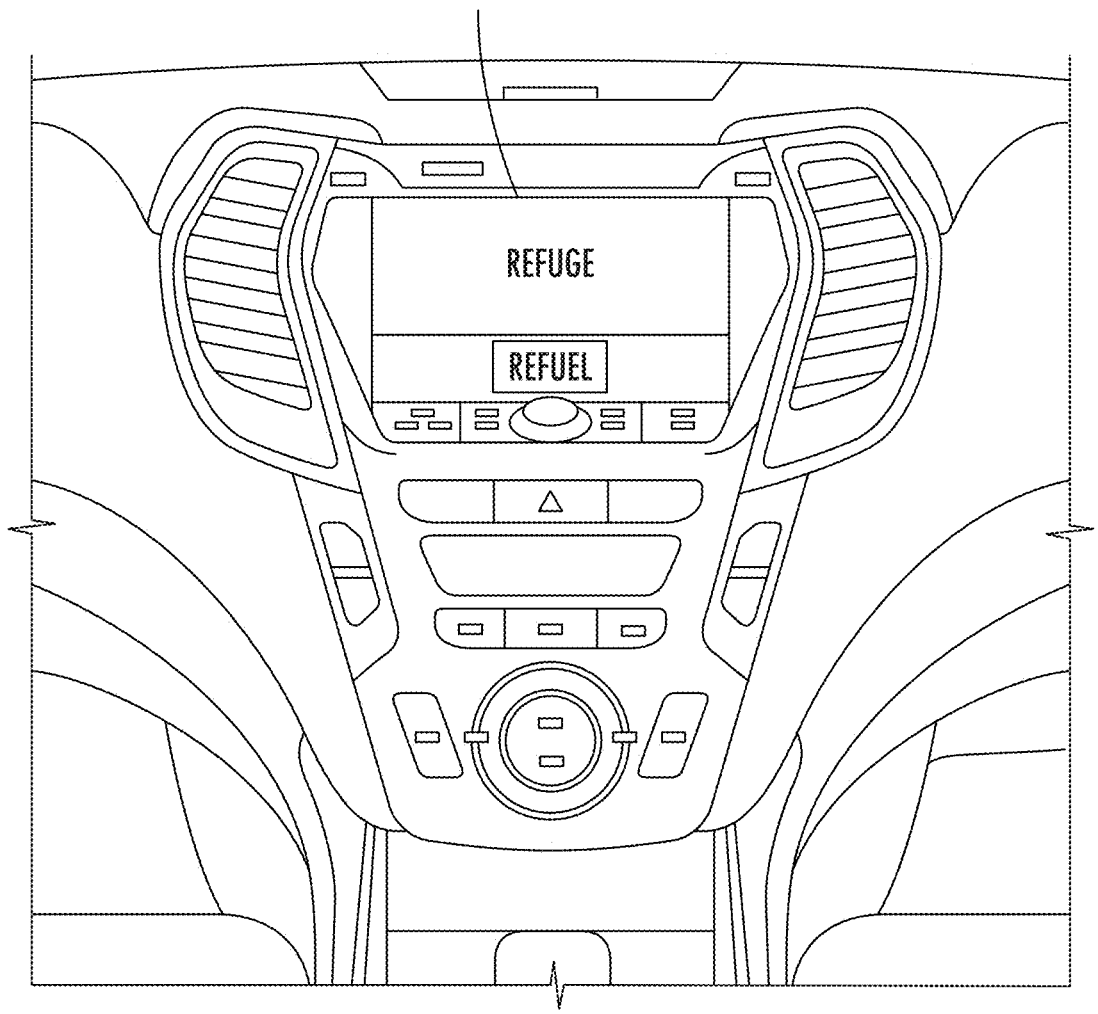
FIG. 7D is a schematic diagram of the interior display screen displaying refuel access mode, according to the present disclosure.

If a driver stops to refuel and there is a passenger in a weight sensor seat FIGS. 2A-2B, 220, the driver wouldn't have to use refueling mode FIG. 7D. Refueling mode FIG. 7D is only for single occupant caregiver that would pay at the pump. If a driver chose to pay inside, they would have to remove the child or someone would have to be inside the vehicle occupying a weight sensor seat, the system cannot be turned off or disabled.

Figure 4:
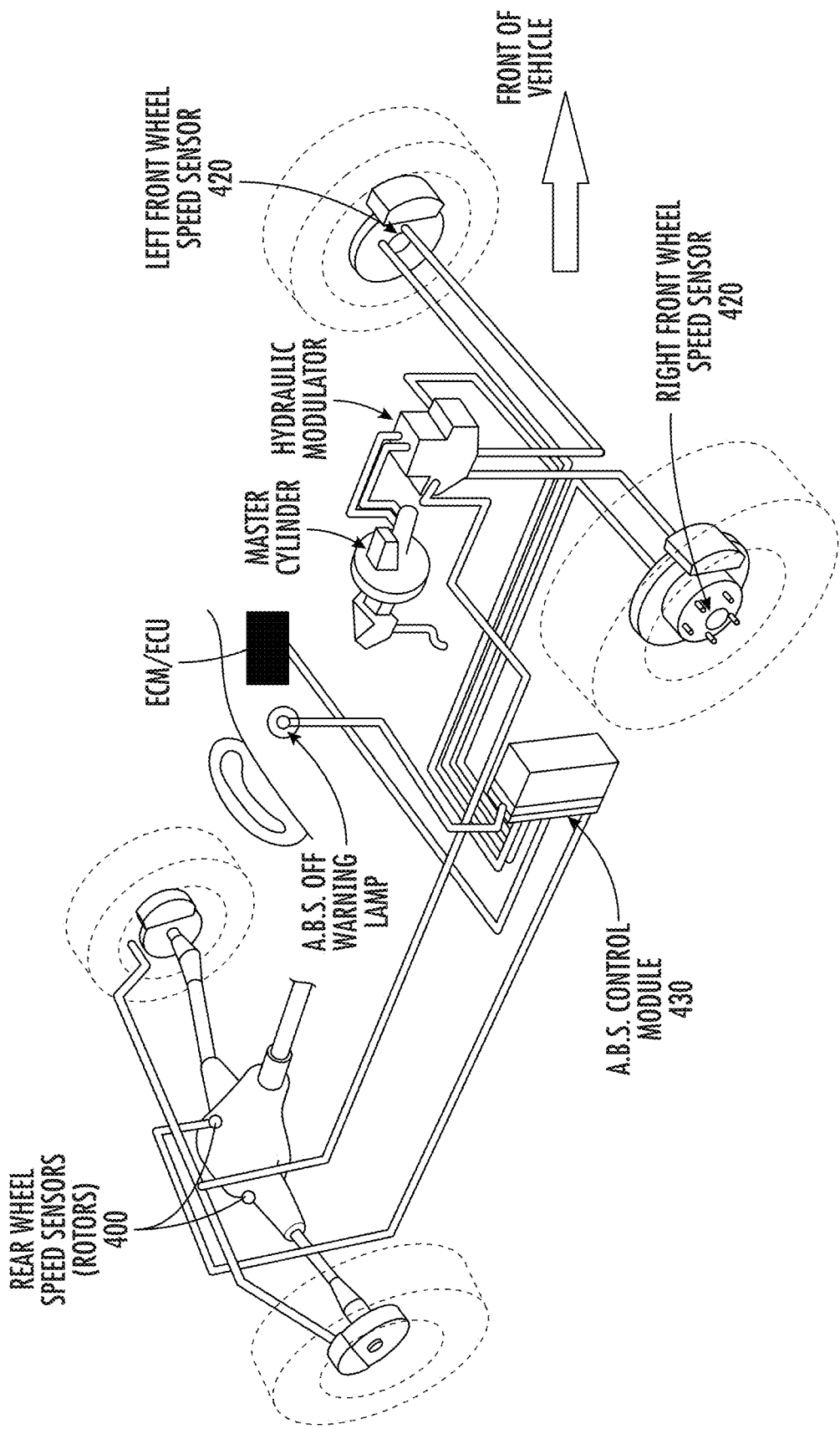
FIG. 4 is a schematic exploded view of an ABS brake system showing the ECM/ECU connecting to the ABS control module for reading the ABS wheel speed sensors via the control module, according to the present disclosure.

FIG. 4 depicts a skeleton view of an ABS brake system. ABS is a safety system that prevents a vehicle from skidding or sliding when the brakes are applied. When the brake is applied, the ABS control module FIG. 4, 430 reads the speed data from the wheel speed sensors FIGS. 4, 420 & 400 and sends the correct pressure to each wheel to prevent any sliding/skidding (wheels locking up). The present invention will use ABS wheel speed sensors FIGS. 4, 420 & 400 to determine when the vehicle is in motion. The job of the wheel speed sensors FIGS. 4, 420 & 400 is to constantly monitor and report the rotational speed of each tire to the ABS control module FIG. 4, 430. On vehicles that have rotors, each wheel will have a wheel speed sensor FIG. 4, 420. On vehicles that have rear drums (instead of rotors), one sensor would monitor both wheels. The present invention will read all wheel speed sensors FIGS. 4, 420 & 400 on a vehicle via the ABS control module FIG. 4, 430. Vehicle motion detection stops an attempt to circumvent the system by placing pseudo weight on a weight sensor enabled seat FIGS. 2A-2B, 220. Vehicle motion detection will work in conjunction with the PIR FIG. 6, 605. If there is weight in a weight sensor enabled seat FIGS. 2A-2B, 220, but no vehicle motion, the passive infrared sensors FIG. 6, 605 would detect for human presence, if the passive infrared sensors FIG. 6, 605 doesn't detect a human, the system would immediately alarm in secure mode FIGS. 2A-2B, 200, 280, 295, 230, 240, 235, 250 & 270. When a vehicle owner first approaches a vehicle equipped with the Child Vehicular Abandonment Prevention System, upon the door ajar sensor FIGS. 2A-2B, 225 being tripped, a signal would be sent to the ECM/ECU FIGS. 1A, 1B & FIGS. 2A-2B, 299 and the pet ISO chip reader 265 would be awaken. The child seat FIGS. 5A, 5B & 5C and the pet ISO chip reader 265 will remain awake until the ABS wheel speed sensor FIGS. 4, 420 & 400 detects motion. If vehicle owner didn't place a child in the child seat FIGS. 5A, 5B & 5C or a pet doesn't come aboard, the ECM/ECU FIG. 1, 1B & FIGS. 2A-2B, 299 would place the child seat FIGS. 5A, 5B & 5C and the pet ISO chip reader 265, 610 back into sleep mode. A secondary method of vehicle motion detection would be the transmission speed sensor (TSS), also commonly referred to as a vehicle speed sensor (VSS). Vehicle motion detection is for stopping an attempt to circumvent the system by placing pseudo weight on a weight sensor enabled seat FIGS. 2A-2B, 220.

Figure 5A:
FIG. 5A is a schematic diagram of a child secured in the child seat with the hardwire leading from the rear of the seat connecting into the access port of the redesigned seatbelt buckle, according to the present disclosure.

FIG. 5A depicts the child seat with its hardwire FIG. 5A, 500 plugged into the redesigned seatbelt buckle FIG. 5A, 505. The hardwire FIG. 5A, 500 connection leading from the child seat would plug directly into the port on the host vehicle redesigned seat belt buckle FIG. 5A, 505 mechanism. Once connected, the ECM/ECU FIGS. 1A, 1B & FIGS. 2A-2B, 299 would then recognize the seat like a computer recognizes a thumb drive allowing verbal alerts/alarms to be relayed through the host vehicle speakers FIGS. 2A-2B, 245 and the vehicle display screen FIG. 7E, 100. Interfacing between child seat FIGS. 5A, 5B & 5C and the ECM/ECU FIGS. 1A, 1B & FIGS. 2A-2B, 299 through the vehicle display screen FIG. 7E, 100 will allow the child seat FIGS. 5A, 5B & 5C to be programmed to the child's name (such as the name of the child who will be occupying the seat) and displayed over the vehicle display screen FIG. 7B, 705A. Interfacing capability also allows the owner of the child seat FIGS. 5A, 5B & 5C to upload their information such as name and cell numbers to the child seat FIGS. 5A, 5B & 5C ECM/ECU FIG. 5B, 500B. With the child and owner information uploaded to the child seat ECM/ECU FIG. 5B, 500B, if the seat is removed from one caregiver vehicle to another caregiver vehicle equipped with the Child Vehicular Abandonment Prevention System, the child seat FIGS. 5A, 5B & 5C would sync to the new vehicle ECM/ECU FIG. 1A, 1B & FIGS. 2A-2B, 299 along with the child's and owner's information by wireless FIGS. 2A-2B, 220 or hardwire FIG. B connection. In this instance, if the new caregiver vehicle is triggered into secure mode FIGS. 2A-2B, 200, 280, 295, 230, 240, 235, 250 & 270, the new caregiver vehicle ECM/ECU FIG. 1A, 1B & FIGS. 2A-2B, 299 would text message the programmed seat owners from the new caregiver vehicle alerting the programmed owners of the situation.

Figure 5B:
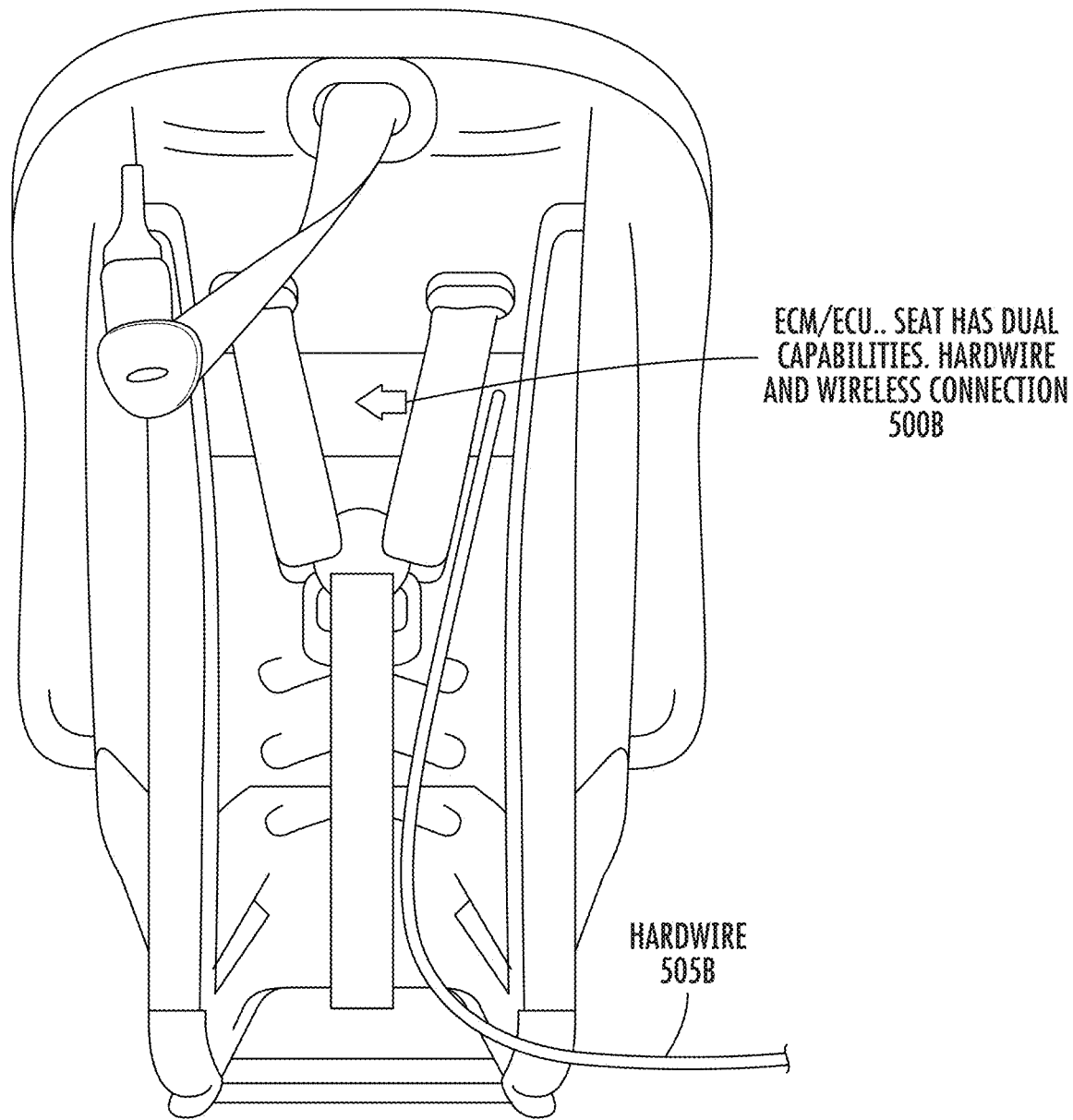
FIG. 5B is a schematic diagram of the child seat and the position of the ECM/ECU along with the hardwire leading from the ECM/ECU, according to the present disclosure.
Figure 5C:
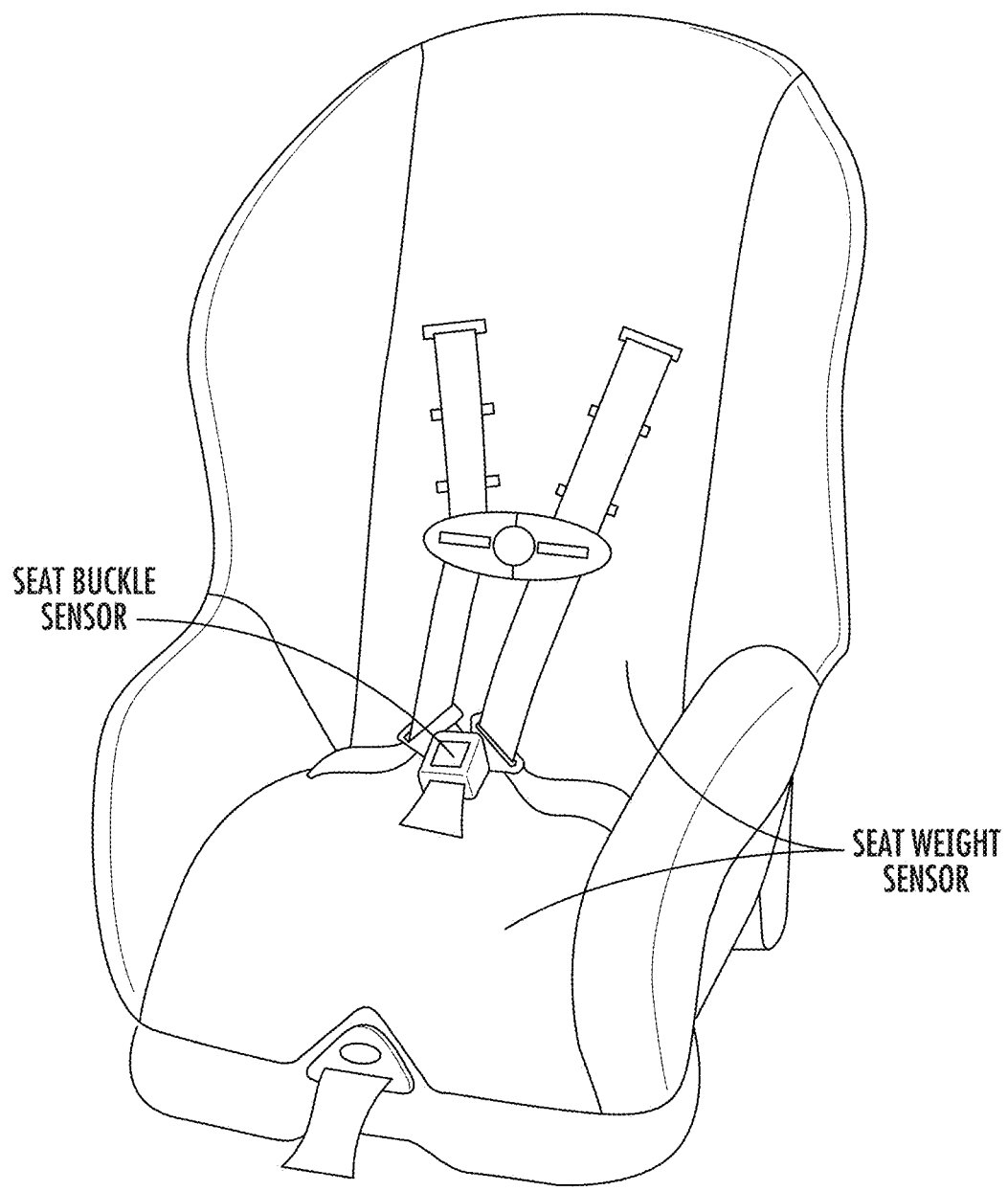
FIG. 5C is a schematic diagram of the child seat with a weight/occupancy sensor covering the seating area and back support area and also displays the seatbelt sensor, according to the present disclosure.
Figure 7E:
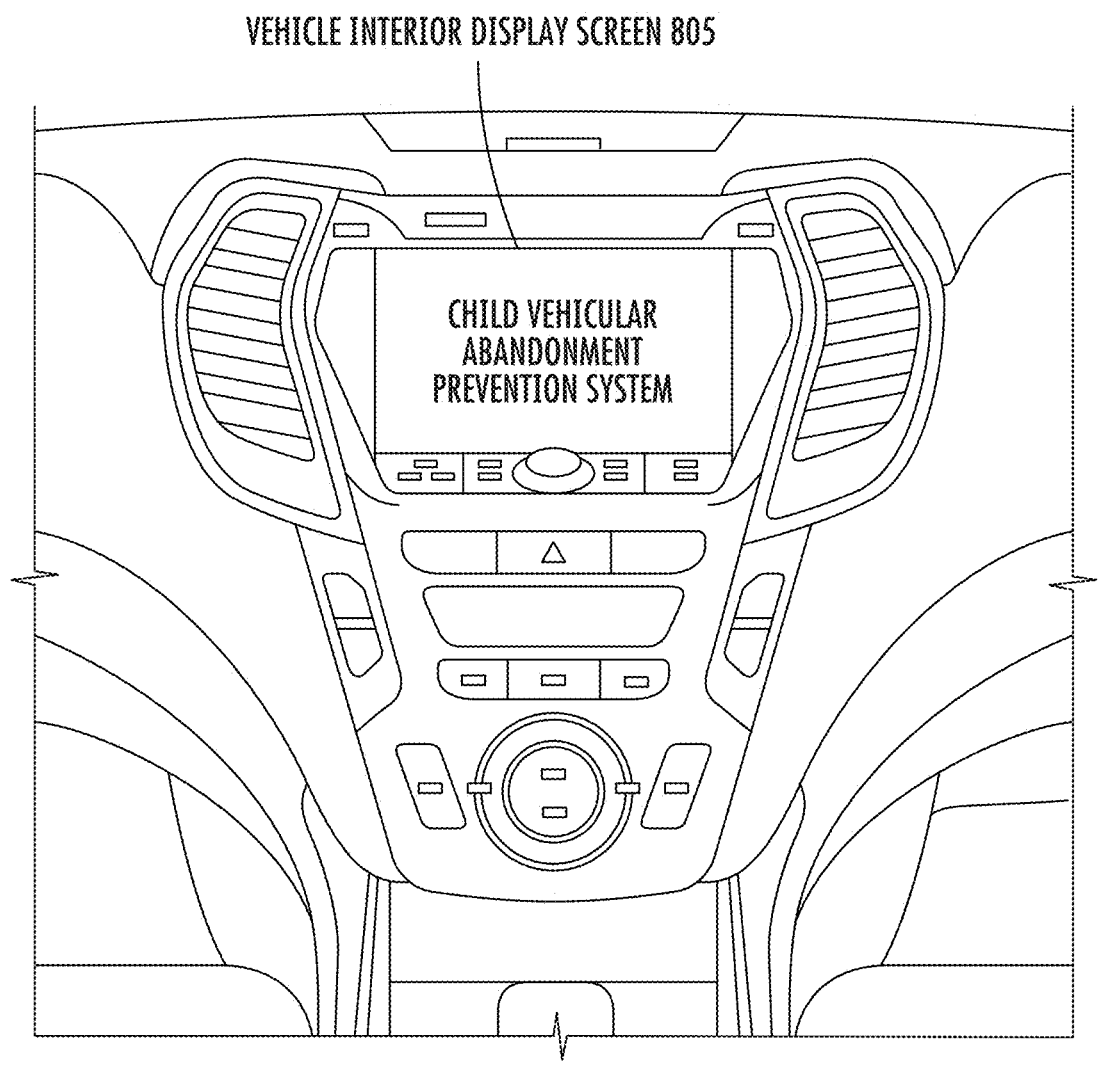
FIG. 7E is a schematic diagram of the interior display screen, according to the present disclosure.
Figure 8:
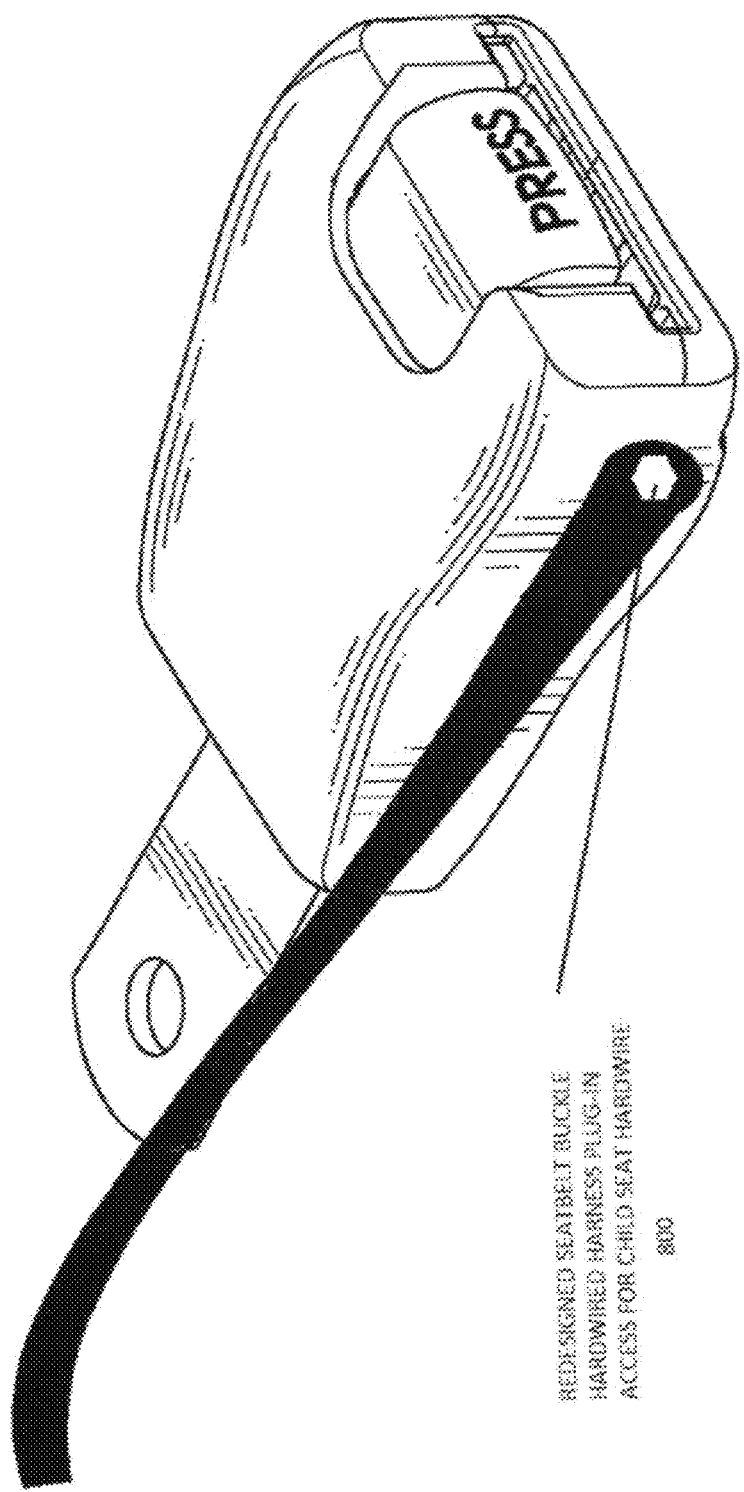
FIG. 8 is a schematic diagram of a seatbelt buckle and a hardwire access port, according to the present disclosure.

The child seat FIGS. 5A, 5B & 5C is capable of being programmed through USB by a home PC, laptop or through the vehicle display screen FIG. 7E, 7D 805 interfacing once sync FIGS. 2A-2B, 220 or plugged in FIG. 8, 800. The child seat FIG. 5C, 100 will acknowledge a child by weight/presence, detecting 6 ounces and greater. If a parent or guardian places a child in a programed child seat FIGS. 5A, 5B & 5C, the invention would say welcome to the child by their name over the vehicle interior speakers FIGS. 2A-2B, 245. After saying welcome, the invention will repeatedly say the child's name over the vehicle speakers FIGS. 2A-2B, 245 and that he/she is onboard (example; welcome Chris, Chris is onboard, Chris is onboard, Chris is onboard) over the vehicle speakers FIGS. 2A-2B, 245 until the driver or someone occupies a weight sensor enabled seat FIGS. 2A-2B, 220.

If a driver seats more than one child in programmed child seats FIGS. 5A, 5B & 5C, the invention would say welcome to each child as they are secured in their seats, with more than one child seated, the repeated interior speaker FIGS. 2A-2B, 245 alert would say "children onboard". If a child seatbelt FIG. 5C, 200 becomes unfasten, the invention would alert vocally over the interior speakers FIGS. 2A-2B, 245 repeatedly saying the child's name and that the seatbelt FIG. 5C, 200 has become unfasten. If the child seat hardwire FIG. 5A, 500 connection becomes disconnected from the seatbelt access port FIG. 5A, 505, FIG. 8, 800 the invention will verbal alert over the vehicle speakers FIGS. 2A-2B, 245 saying "wire connection has been lost", the invention wireless antenna FIGS. 2A-2B, 202 would then pick up child seat FIGS. 5A, 5B & 5C wireless signal. In both instances, the vehicle display screen FIG. 7E, would also display messages stating the loss of connectivity. The invention would distinguish alerts/alarms by each child seat FIGS. 5A, 5B & 5C. When the driver has reached their destination, as soon the vehicle door ajar FIGS. 2A-2B, 225 is detected, the invention will alert over the vehicle speakers FIGS. 2A-2B, 245 repeatedly saying the child's name and that they are onboard (Chris is onboard, Chris is onboard, Chris is onboard/if more than one child, it would repeatedly say children are onboard) until the child/children are removed from the child seat FIGS. 5A, 5B & 5C. When a driver exits the vehicle removing weight from the seat weight sensor FIGS. 2A-2B, 220, the ECM/ECU FIGS. 1A, 1B & FIGS. 2A-2B, 299 will allow 3 minutes for driver to remove child from the child seat FIG. 5A. If child isn't removed in 3 minutes, system will trigger the vehicle horn to sound intermittently for 1 minute before going into secure mode FIGS. 2A-2B, 200, 280, 295, 230, 240, 235, 299, & 270 believing the child has been abandoned. The 1 minute is to alert the driver and or that time has expired before going into full secure mode FIGS. 2A-2B, 200, 280, 295, 230, 240, 235, 250 & 270 which in addition to the intermittent horn sounding, the vehicle alarm, the alarm voice module, power door locks locking, ignition starting vehicle, elevating windows, temperature sensor determining A/C or heat, A/C or heat being turned on, text message a logged love one and dialing 911 and GPS location at 10 minutes of alarming. When not in use, child seat FIG. 5A will go into sleep mode. The child seat FIGS. 5A, 5B & 5C and the pet ISO microchip reader 265 & 610 awakens by vehicle door ajar FIGS. 2A-2B, 225 without ignition FIGS. 2A-2B, 230 on or vehicle engine running. When a vehicle owner first approaches a vehicle equipped with the Child Vehicular Abandonment Prevention System, upon the door ajar sensor FIGS. 2A-2B, 225 being tripped, a signal would be sent to the ECM/ECU FIGS. 1A, 1B & FIGS. 2A-2B, 299 to wake the child seat FIGS. 5A, 5B & 5C. The child seat FIGS. 5A, 5B & 5C will remain awake until the ABS wheel speed sensor FIGS. 4, 420 & 400 detects motion. If child seat FIGS. 5A, 5B & 5C weight/occupancy sensor FIG. 5C haven't detected a presence once wheel speed sensors FIGS. 4, 420 & 400 detects motion, the ECM/ECU FIG. 1, 1B & FIGS. 2A-2B, 299 would place the child seat FIGS. 5A, 5B & 5C back into sleep mode. If a child or children are placed in the child seats FIGS. 5A, 5B & 5C, the driver will have 3 minutes per child seat FIG. 5A, 5B & 5C to secure each child and occupying a weighted sensor seat FIGS. 2A-2B, 220 to detour secure mode alarming FIGS. 2A-2B, 200, 280, 295, 230, 240, 235, 299 & 270. The invention will not discriminate from wireless sync or plugged in child seats FIG. 5B to execute time limit. If only one child is being seated in a child seat FIGS. 5A, 5B & 5C rather sync or plugged into the system, the system will have a 3-minute limit for a driver to secure the child and occupy a weight sensor enabled seat FIGS. 2A-2B, 220. If 2 children are being seated, driver would have 6 minutes to occupy a weight sensor seat FIGS. 2A-2B, 220; if 3 children are being seated, driver would have 9 minutes to seat all children and occupy a weight sensor seat FIGS. 2A-2B, 220 to thwart secure mode alarming FIGS. 2A-2B, 200, 280, 295, 230, 240, 235, 250 & 270. The ECM/ECU timer FIG. 1A, 100 would reset the 3 minutes once the next child is placed in their child seat FIGS. 5A, 5B & 5C and the child seat FIGS. 5A, 5B & 5C detects weight/presence FIG. 5C, 100. When the driver has reached their destination with 2 or more children onboard and exit the vehicle, if the driver doesn't remove the first child in 3 minutes, system will trigger the vehicle horn to sound intermittently for 1 minute before going into secure mode FIGS. 2A-2B, 200, 280, 295, 230, 240, 235, 250 & 270 believing the child has been abandon. The 1 minute is to alert the driver and or that time has expired before going into full secure mode FIGS. 2A-2B, 200, 280, 295, 230, 240, 235, 250, & 270 which in addition to the intermittent horn sounding, the vehicle alarm, the alarm voice module, power door locks locking, ignition starting vehicle, elevating windows, temperature sensor determining A/C or heat, A/C or heat being turned on, text message a logged love one and dialing 911 and GPS location at 10 minutes of alarming. If the 1 minute intermittent horn sounding is triggered, caregiver would still have an opportunity to remove child/children during the intermittent horn sounding before vehicle goes into secure mode FIGS. 2A-2B, 200, 280, 295, 230, 240, 235, 250, & 270 by removing child/children from their child seat which would cease the intermittent horn sounding and thwart secure mode FIGS. 2A-2B, 200, 280, 295, 230, 240, 235, 250, & 270 alarming. The child seat ECM/ECU FIG. 5B, 500B would signal the ECM/ECU FIGS. 1A, 1B & FIGS. 2A-2B, 299 to restart the 3 minutes each time a child is removed from a child seat FIGS. 5A, 5B & 5C. The child seat ECM/ECU FIG. 5B, 500B would be mounted on rear of child seat FIGS. 5A, 5B & 5C. All above applies to infant carrier seats.

Figure 6:
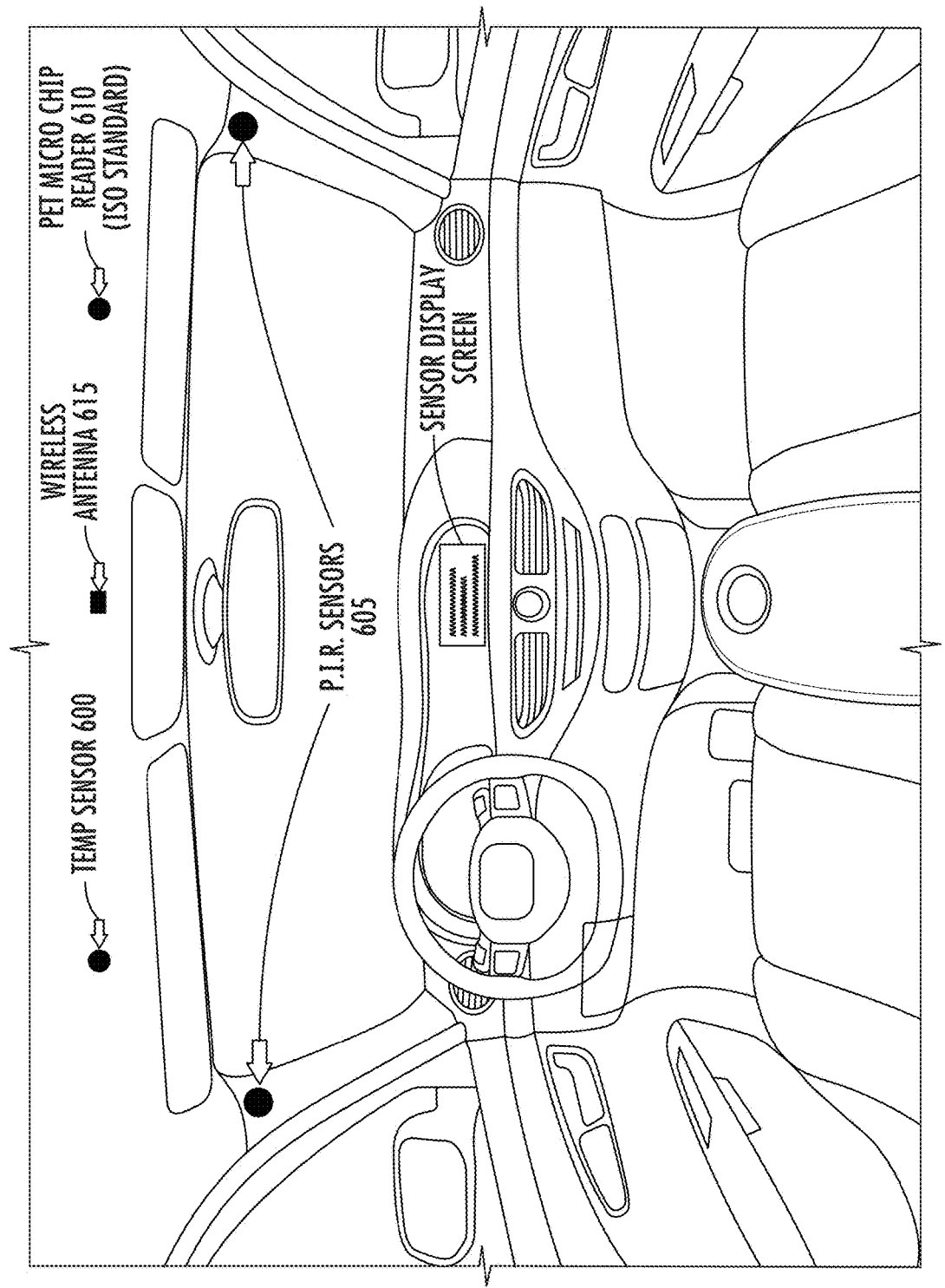
FIG. 6 is a schematic diagram of position and view of the temperature sensor, pet microchip reader, passive infrared sensors (PIR) and the wireless antenna, according to the present disclosure.

FIG. 6 depicts a cockpit interior view of a vehicle displaying the position of the temperature sensor 600, passive infrared sensors 605, ISO pet microchip reader 610 and the wireless antenna 615. The temperature sensor FIG. 6, 600 will read the vehicle inside temperature only. The sole purpose of the temperature sensor is determining rather the A/C or heat FIGS. 2A-2B, 250 would be turned on during secure mode alarming FIGS. 2A-2B, 200, 280, 295, 230, 240, 235, 250 & 270. The temperature sensor FIG. 6, 600 is not used to trigger the system to alarm due to perilous interior temperature, but as the above, the temperature sensor FIG. 6, 600 only determines rather the A/C or heat FIGS. 2A-2B, 250 will be turned on during secure mode alarming FIGS. 2A-2B, 200, 280, 295, 230, 240, 235, 250 & 270. The invention does not alarm by temperature threat, secure mode alarming FIGS. 2A-2B, 200, 280, 295, 230, 240, 235, 250, & 270 is triggered after the intermittent horn sounding has alarmed for 1 minute due to the 3-9 minute timer has been ignored and weight being removed from all weight sensor enabled seats FIGS. 2A-2B, 220 with a child/children still seated in the child seat FIGS. 5A, 5B & 5C or a pet haven't been removed leaving the system to believe a child/children or pet has been left unattended. The vehicle horn would alarm intermittently first for 1 minute. The 1 minute is to alert the driver and or that time has expired before going into full secure mode FIGS. 2A-2B, 200, 280, 295, 230, 240, 235, 250 & 270 which in addition to the intermittent horn sounding, the vehicle alarm, the alarm voice module, power door locks locking, ignition starting vehicle, elevating windows, temperature sensor determining A/C or heat, A/C or heat being turned on, text message a logged love one and dialing 911 and GPS location at 10 minutes of alarming. FIG. 6, 605 represents passive infrared sensors. The term passive in this instance refers to the fact that PIR devices do not generate or radiate any energy for detection purposes. They work entirely by detecting the energy given off by other objects. PIR sensors don't detect or measure "heat"; instead they detect the infrared radiation emitted or reflected from an object. All objects with a temperature above absolute zero emit heat energy in the form of radiation. Usually this radiation isn't visible to the human eye because it radiates at infrared wavelengths, but it can be detected by electronic devices designed for such a purpose. Seat weight sensors FIGS. 2A-2B, 220 detection can possibly be circumvented by placing weighted items on the seat. For this cause, the invention would have PIR sensors FIG. 6, 605 capable of detecting the entire vehicle interior. FIG. 6, 605 sensor will work in conjunction with the ABS wheel sensor FIGS. 4, 400 & 420 for motion detection. Meaning, if there's no vehicle motion and a child is seated in the child seat FIGS. 5A, 5B & 5C and weight is present in a weight sensor enabled seat FIGS. 2A-2B, 220, the PIR sensors FIG. 6, 605 would activate to make sure the weight is human not pseudo. If no human presence is detected, the invention will immediately alarm in secure mode FIGS. 2A-2B, 200, 280, 295, 230, 240, 235, 250 & 270 believing there is an attempt to circumvent the system and an abandonment situation. No motion consists of the transmission in any gear and engine running or not or parked. FIG. 6, 610 is an ISO pet microchip reader (International Standards Organization), the global standard that is consistent worldwide and use the ISO standard frequency is 134.2 kHz. Since pet chips don't operate on the same frequency, the ISO capable readers are capable of reading all frequencies. For example, if a dog was implanted with an ISO standard microchip in the U.S. travels to Europe with its owners and becomes lost, the ISO standard scanners in Europe would be able to read the dog's microchip. If the dog was implanted with a non-ISO microchip and the ISO scanner was not forward- and backward-reading (universal), the dog's microchip might not be detected or be read by the scanner. The ISO chip reader FIG. 6, 610 is for detecting pets in a vehicle and would prompt the system to acknowledge a pet once it enters the vehicle by saying welcome to the pet by its name if logged. If a microchipped pet was left in a vehicle equipped with the invention, the vehicle would alarm in secure mode FIGS. 2A-2B, 200, 280, 295, 230, 240, 235, 250, & 270 announcing "pet onboard unattended". If a child and pet is left in a vehicle equipped with the invention, vehicle would alarm in secure mode FIGS. 2A-2B, 200, 280, 295, 230, 240, 235, 250, & 270 announcing the threat to the child, "child onboard unattended". If a pet is in the vehicle, as soon as the system detects the vehicle door ajar FIGS. 2A-2B, 225, it would alarm over the vehicles speakers FIGS. 2A-2B, 245 saying pet onboard or by the pet's name if it has been programmed into the system saying the pet's name is onboard. If a child and pet was in the vehicle, as soon as the system detects the vehicle door ajar FIGS. 2A-2B, 225, it would alarm over the vehicles speakers FIGS. 2A-2B, 245 saying child name is onboard if logged. The invention will continue to alarm until pet is removed from the vehicle. Driver will have 3 minutes to remove pet from the vehicle after exiting from weight sensor enabled seat FIGS. 2A-2B, 220 of vehicle. If pet isn't removed in 3 minutes and no one is occupying a weight sensor enabled seat FIGS. 2A-2B, 220, system will trigger the vehicle horn to sound intermittently for 1 minute before going into secure mode FIGS. 2A-2B, 200, 280, 295, 230, 240, 235, 250, & 270 believing the pet has been abandoned. The 1 minute is to alert the driver and or that time has expired before going into full secure mode FIGS. 2A-2B, 200, 280, 295, 230, 240, 235, 250, & 270 which in addition to the intermittent horn sounding, the vehicle alarm, the alarm voice module, power door locks locking, ignition starting vehicle, elevating windows, temperature sensor determining A/C or heat, A/C or heat being turned on, text message a logged love one and dialing 911 and GPS location at 10 minutes of alarming. If pet is removed from vehicle without incident, once pet exit the vehicle and the ISO chip reader 265, 610 disengages the pet microchip, the ISO chip reader 265, 610 would go back into sleep mode.

FIG. 6, 615 is a wireless antenna to accommodate the wireless capability of the child seat FIG. 5B. The wireless capability will transmit wireless communication between the ECM/ECU FIGS. 1A, 1B & FIGS. 2A-2B, 299, the child seat FIGS. 5A, 5B & 5C & for the interior display screen FIG. 7E, 100 to display wearable wireless thermometer patch (See, e.g., U.S. Patent Application Publication No. 2014/0121557 to Gannon et al.) 24-hour intelligent thermometer that's wearable, wireless and continuously monitors a child's temperature to be displayed on the vehicle's interior display screen FIG. 7A, 700.

FIGS. 7A, 7B, 7C, 7D & 7E depict the interior display of a vehicle. It will allow access to the invention functions such as refueling mode FIG. 7D, live display of a child's temperature FIG. 7A through the wearable wireless thermometer patch (See, e.g., U.S. Patent Application Publication No. 2014/0121557 to Gannon et al.) 24-hour intelligent thermometer that's wearable, wireless and continuously monitors a child's temperature. Programming through touch screen capability and display alarms/alerts situation status. Vehicle owners would have interface interaction with the system through the vehicle display screen FIG. 7E. Pictures of a child or pet would be displayed through the display screen when alarming/alerting, welcoming a child or pet and special events such as birthdays FIG. 7B, 705A. FIG. 7C, 710B will display if vehicle goes into secure mode FIGS. 2A-2B, 200, 280, 295, 230, 240, 235, 250, & 270.

FIG. 8 depicts a conventional seatbelt buckle redesigned with an access port to allow FIG. 5A, 500 & FIG. 5B, 505B to plug into the seatbelt buckle FIG. 8. Every vehicle rear seat buckle FIG. 8 will have an access port FIG. 8, 800 without losing integrity to secure occupants. The hardwired harness FIG. 10, B1 bridges the connection between the ECM/ECU FIGS. 1A, 1B & FIGS. 2A-2B, 299 and the seatbelt access port FIG. 8, 800 from underneath the vehicle seating while FIG. 5A, 500 & FIG. 5B, 505B will connect to the seatbelt access port FIG. 5A, 505.

Figure 9:
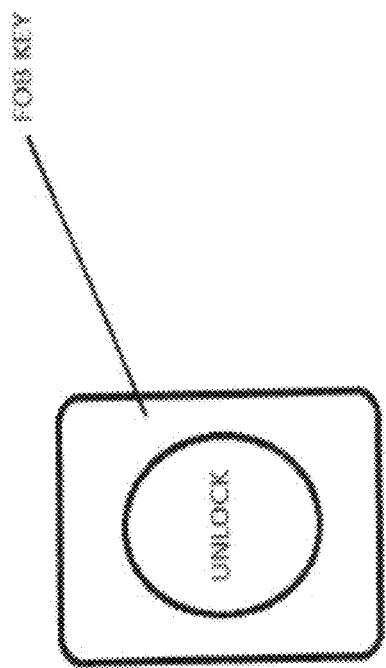
FIG. 9 is a schematic diagram of a key fob, according to the present disclosure.

FIG. 9 depicts a key fob with only an unlock feature. It is a keyless entry device that only first responders would have to disarm/unlock a Child Vehicular Abandonment Prevention System equipped vehicle when in secure mode FIGS. 2A-2B, 200, 280, 295, 230, 240, 235, 250, & 270. First responders typically include Police Officers, Deputy Sheriffs, Troopers, Firefighters, Paramedics, EMT and Rescuers. Key fob (FIG. 9) may also be given to any Citizens Patrol program. Civilians who may investigate an alarming Child Vehicular Abandonment Prevention System equipped vehicle wouldn't have to attempt to gain access inside the vehicle due to the system would make it comfortable for the child (AC or heat FIGS. 2A-2B, 250) and secure (doors locked FIGS. 2A-2B, 240). In most cases, civilians who witness an alarming Child Vehicular Abandonment Prevention System equipped vehicle, would call authorities before the 10 minutes' lapse at which the invention would phone authorities, this eliminates premature calls to authorities from the invention. A first responder would come and unlock the vehicle due to the vehicle entering secure mode FIGS. 2A-2B, 200, 280, 295, 230, 240, 235, 250, & 270 which denotes a possible abandonment situation. This gives authorities the opportunity to question the caregiver and investigate the situation. If system is provoked to alarm in secure mode FIGS. 2A-2B, 200, 280, 295, 230, 240, 235, 250, & 270, but a door or doors are left open, the invention would trigger an abridged version of full secure mode FIGS. 2A-2B, 200, 280, 295, 230, 240, 235, 250, & 270 in which of FIGS. 2A-2B, 200, 280, 295, 230 would only activate and the ECM/ECU FIG. 1, 1B & FIGS. 2A-2B, 299 would "immediately" contact 911 FIGS. 2A-2B, 295, text message logged love ones, give Global Positioning System (GPS) location and lock the ignition FIGS. 2A-2B, 230 preventing anyone starting the vehicle and wouldn't start the vehicle if doors are open. FIG. 9 is only capable of triggering the ECM/ECU FIGS. 1A, 1B & FIGS. 2A-2B, 299 to disarm/unlock a Child Vehicular Abandonment Prevention System equipped vehicle that is in secure mode FIGS. 2A-2B, 200, 280, 295, 230, 240, 235, 250, & 270; FIGS. 2A-2B, 230, 200, 280 & 295. Once a Child Vehicular Abandonment Prevention System equipped vehicle is triggered into secure mode FIGS. 2A-2B, 200, 280, 295, 230, 240, 235, 299, & 270 the vehicle owner hard key or key fob wouldn't be capable of unlocking the vehicle. Secure mode FIGS. 2A-2B, 200, 280, 295, 230, 240, 235, 250, & 270 would block the hard key from unlocking the vehicle doors and cancel out the owner's key fob signal until the vehicle has been disarmed/unlocked from secure mode FIGS. 2A-2B, 200, 280, 295, 230, 240, 235, 250, & 270 by key fob FIG. 9. Key fob (FIG. 9) would use a different signal from the vehicle's keyless entry signal to trigger the ECM/ECU FIGS. 1A, 1B & FIGS. 2A-2B, 299 to disarm/unlock. The vehicle hard key door lock will not allow the hard key to unlock the vehicle door when in secure mode.

Figure 10:
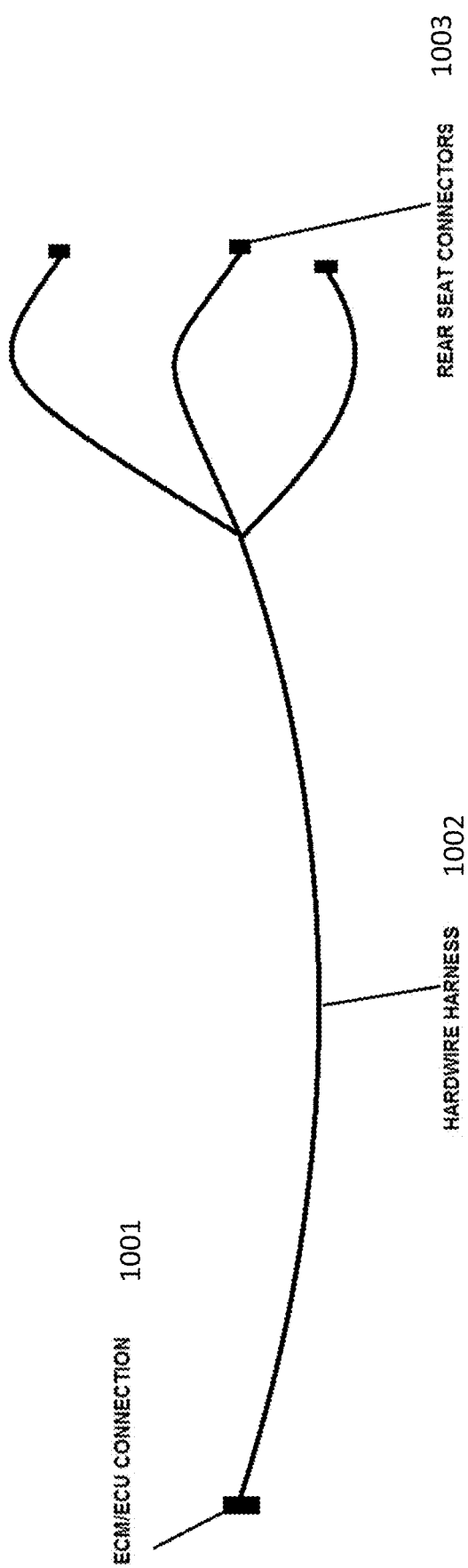
FIG. 10 is a schematic diagram of a hardwire harness, according to the present disclosure.

FIG. 10 (1001, 1002, 1003) depicts a hardwire harness with an ECM/ECU FIGS. 1A, 1B & FIGS. 2A-2B, 299 connection FIGS. B2 and 3 rear seatbelt buckles connections. The hardwire harness FIG. 10 would be mounted in vehicles at production. Its bridges the ECM/ECU FIGS. 1A, 1B & FIGS. 2A-2B, 299 and child seat FIGS. 5A, 5B & 5C. Its purpose is to transmit and receive electronic messages, alerts and alarms from the ECM/ECU FIG. 1A, 1B & FIGS.

2A-2B, 299 & the child seat FIGS. 5A, 5B & 5C. The hardwire harness FIG. 10 would also maintain a charge and recharge the child seat FIGS. 5A, 5B & 5C.

Figure 11:
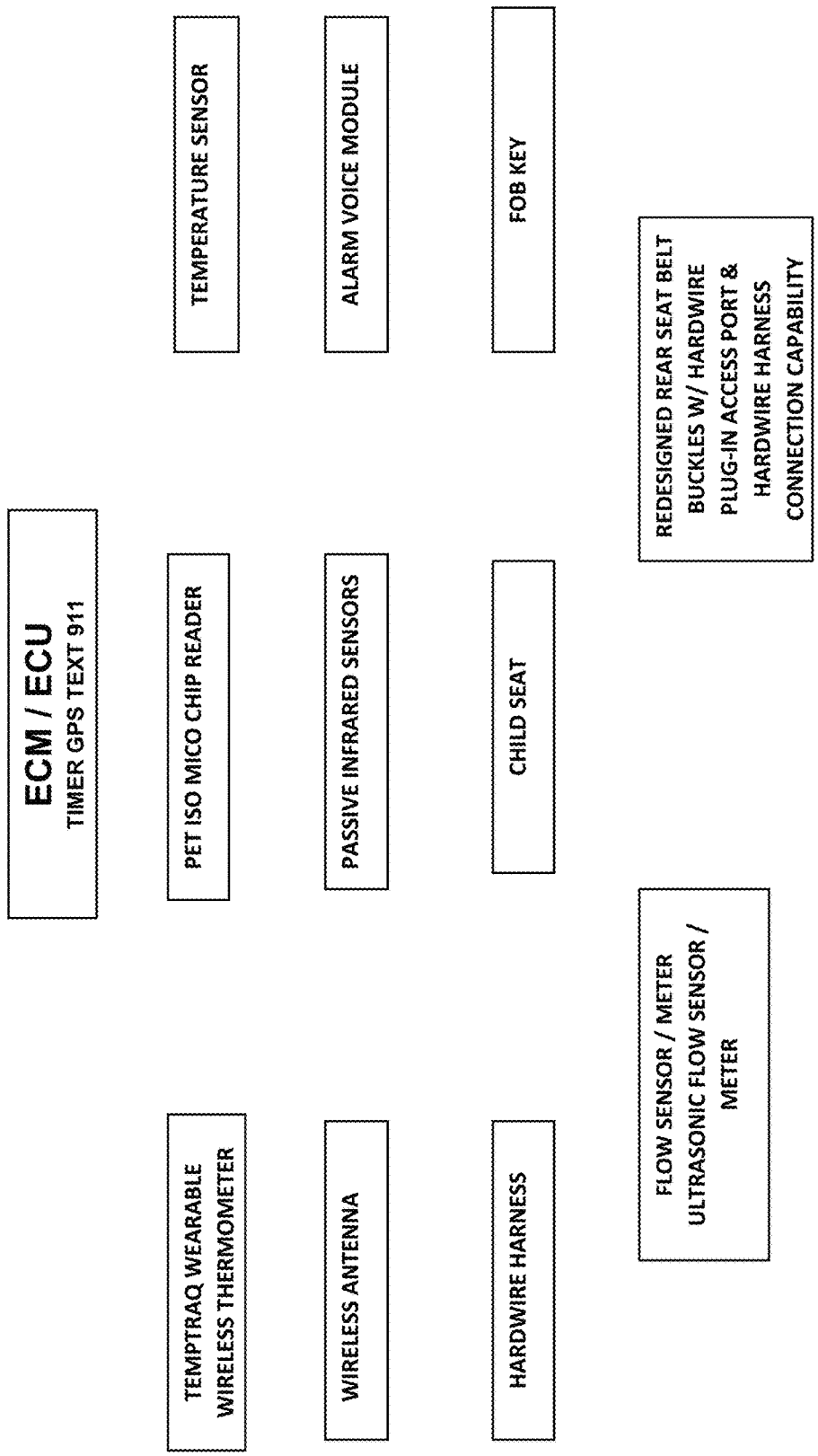
FIGS. 11-12 are schematic diagrams of non-native vehicle components and native components in the vehicle safety system, according to the present disclosure.
Figure 12:
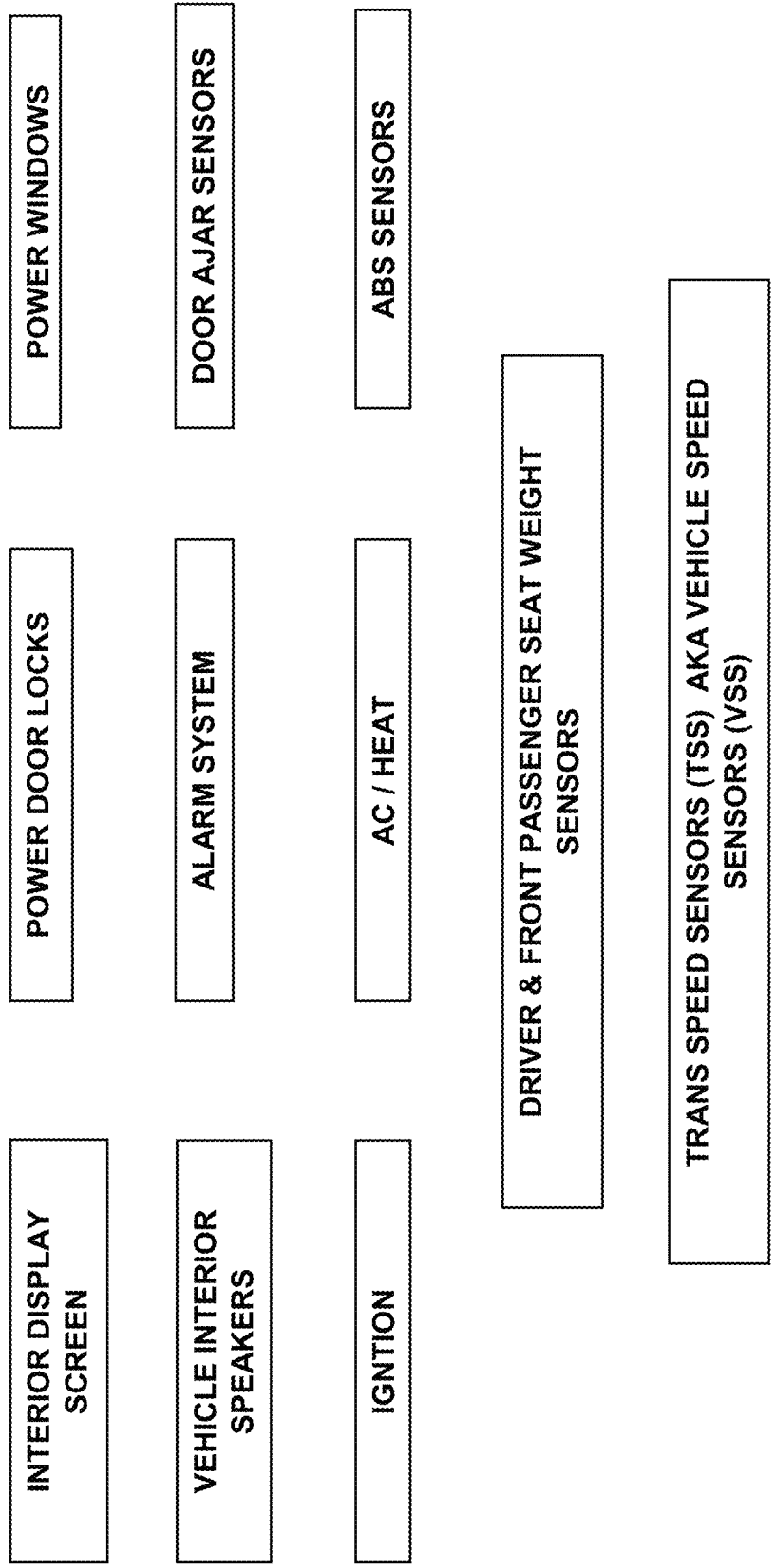
Figure 13:
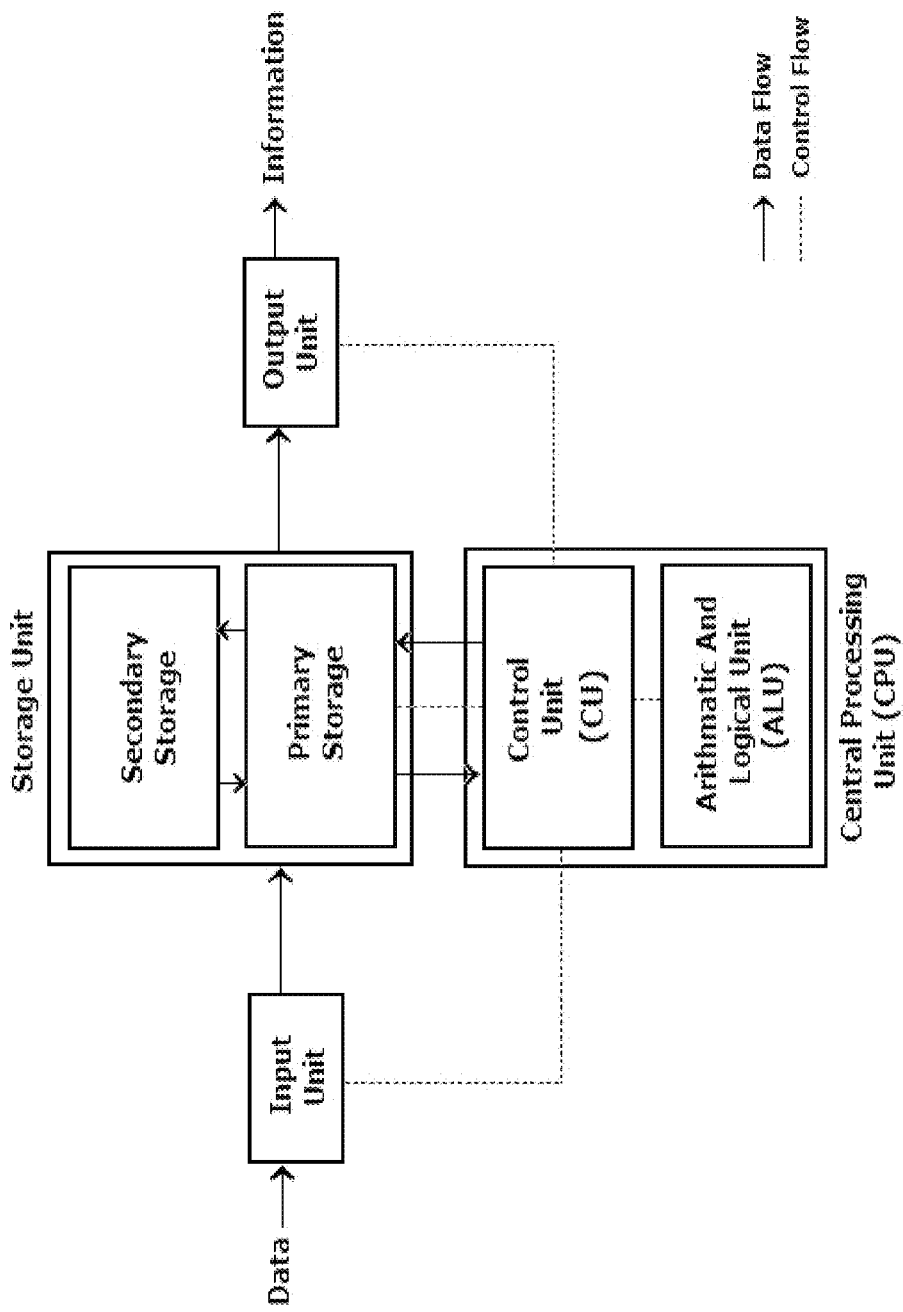
FIG. 13 is a schematic diagram of the ECM/ECU in the vehicle safety system, according to the present disclosure.
Figure 14:
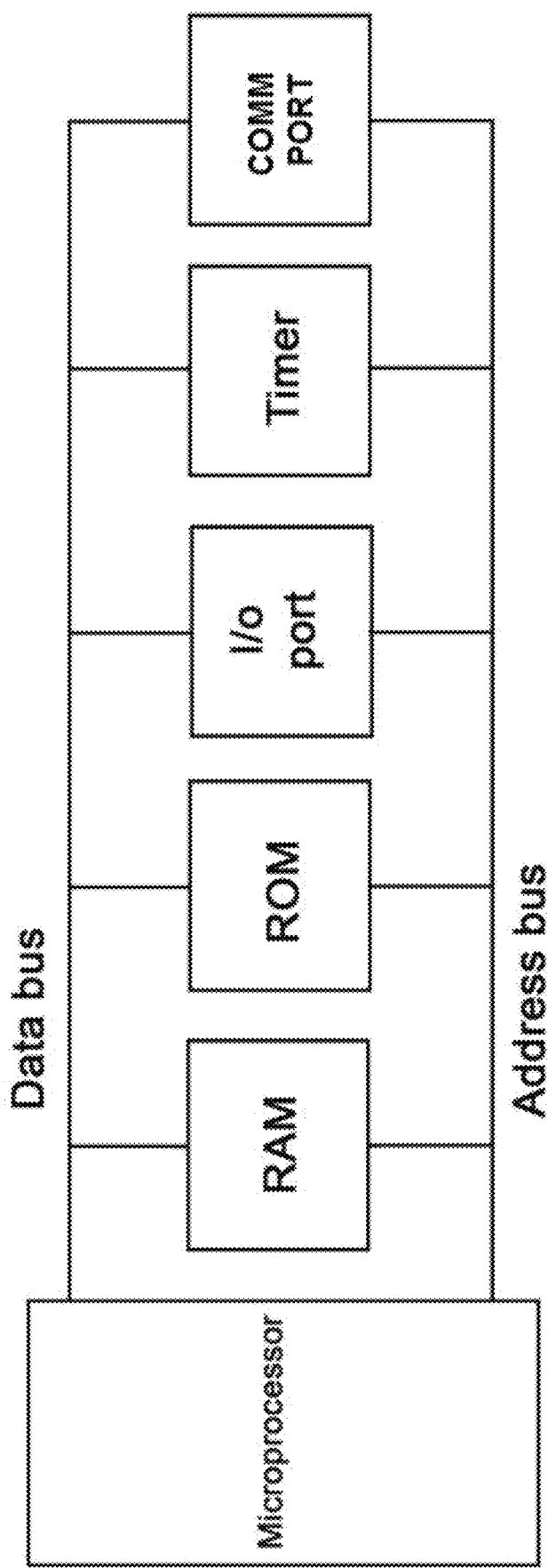
FIG. 14 is a schematic diagram of the child seat ECM/ECU.
Figure 15:
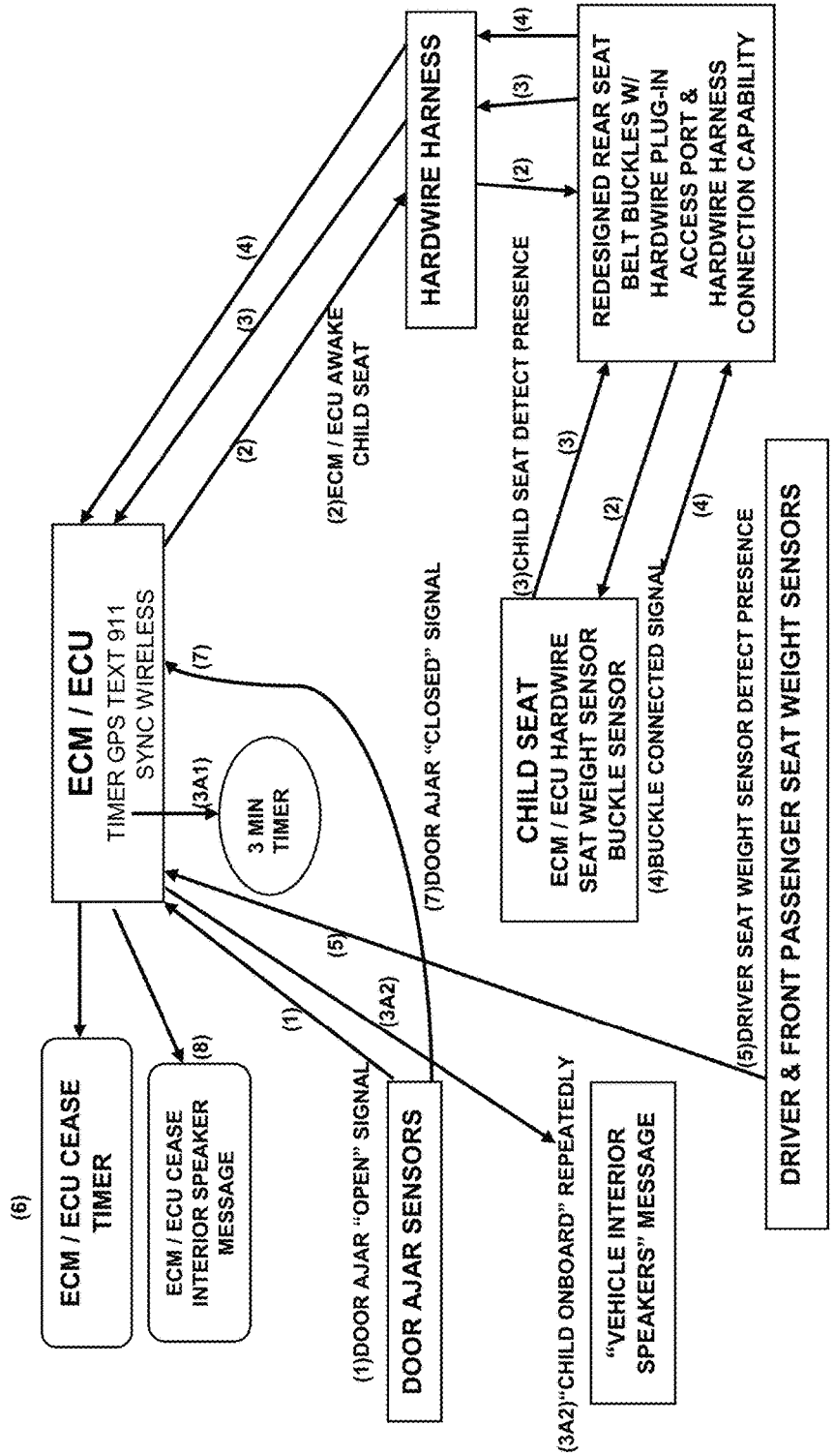
FIGS. 15 and 16 are flowcharts for operation of the vehicle safety system, according to the present disclosure.
Figure 16:
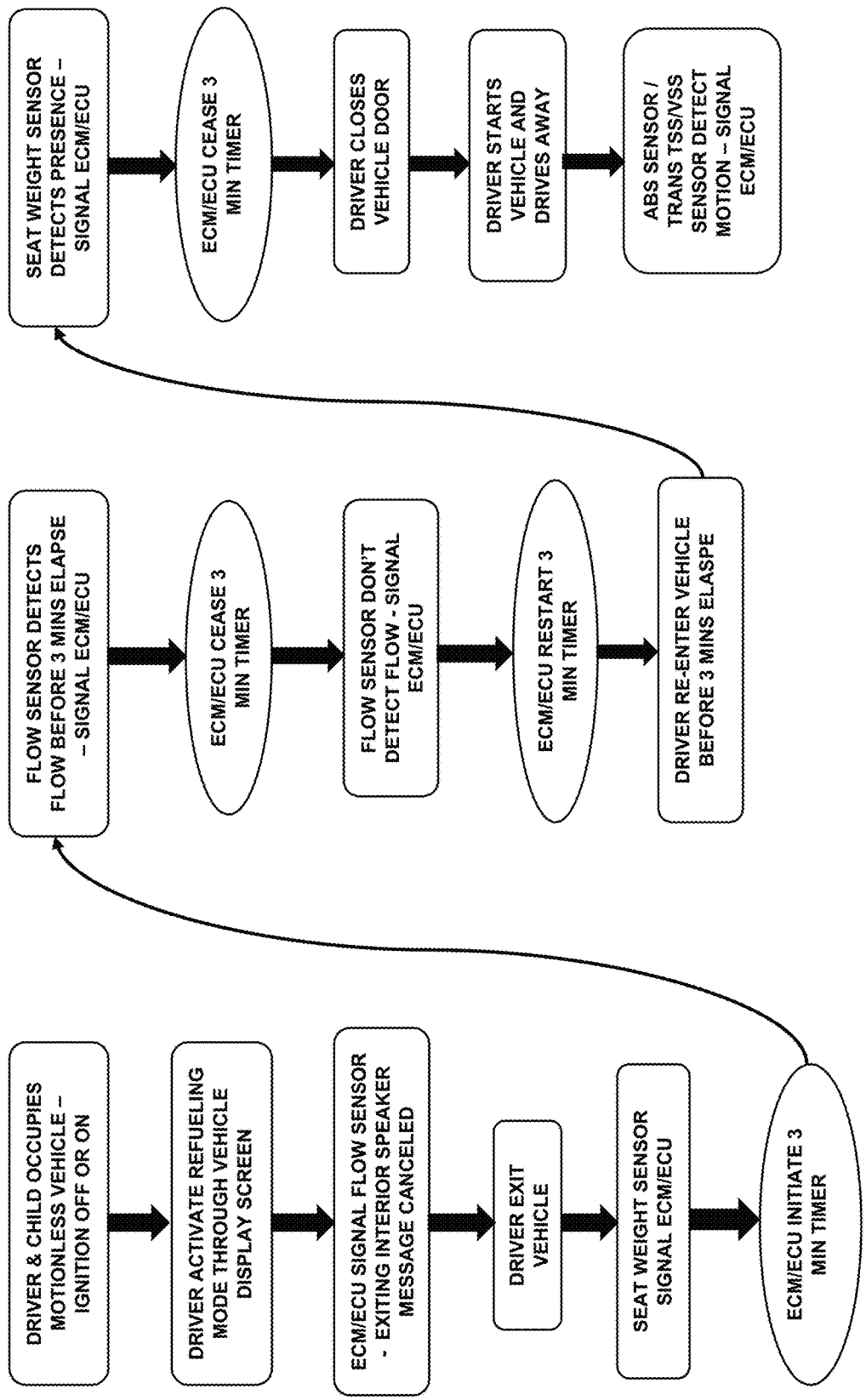

FIG. 11 lists all the components in which makes up the system. FIG. 12 list all the vehicle accessories/components in which the disclosed child vehicle abandonment prevention system (CVAPS) would employ. FIG. 13 depicts the architecture of CVAPS ECM/ECU electronic circuitry. FIG. 14 depicts a stick aero flow chart signal sequence between the ECM/ECU, vehicle components/accessories and child seat ECM/ECU when accessing an unoccupied CVAPS equipped vehicle for first use, placing a child in the child seat. FIG. 15 depicts a flow chart signal sequence of a driver and child occupant, engaging refueling mode while the child remains in the vehicle secured in the child seat.

CVAPS is an innate system which would be assembled in the host vehicle at factory production. The ECM/ECU would preferably be mounted in the engine compartment (front clip) of the vehicle. The pet microchip reader, wireless antenna and temperature sensor would preferably be mounted onto the interior ceiling of the host vehicle. The passive infrared sensors would preferably be mounted onto the front interior roof pillars of the host vehicle. The alarm voice module would preferably be mounted in the engine compartment area (front clip) of the host vehicle. The hardwire harness will be situated along the floorboard underneath the carpeting and insulation of the host vehicle running from the front clip area to the rear seating of the host vehicle. The redesigned rear seatbelt buckles would remain in their natural place as defined by the vehicle maker. The flow sensor/meter will be constructed inside of the fuel filler neck, congruous to each vehicle maker part and standard. The ultra-sonic flow sensor/meter will be constructed outside of the fuel filler neck congruous to each vehicle maker part and standard.

The child seat would be designed and constructed according to Federal Motor Vehicle Safety Standard with its ECM/ECU constructed onto it. The fob key will be constructed to disarm the ECM/ECU out of secure mode. All of the above constituents will connect to the ECM/ECU through wire connections or wireless. The wearable wireless thermometer patch wireless capability will sync to CVAPS wireless capability to display a child's temporal temperature, in other words, the wearable wireless thermometer patch would not be wired to the ECM/ECU. It is to be understood that CVAPS is open loop or constant current system that when the host vehicle is approached for first use, opening any door of a host vehicle awakens the system through door ajar sensor/signal. If a child is placed in the child seat or a pet comes aboard, the entire CVAPS will become active and render protection as long as the system detects a child or pet presence until the child or pet is removed. If no child or pet comes aboard, the system would go back into sleep mode. This negates determining if the vehicle ignition position is on or off.

Herein is provided a new and improved means for preventing the abandonment of a child/children or pet occupants in a vehicle which has heretofore not been taught. Thus, there has been provided a system for alerting a driver "before exiting" a vehicle to the presence of a child or pet, and civilians external to a vehicle of the presence of a child or pet inside a vehicle with capability of policing a driver's time outside of a vehicle and allowing authorities to investigate immediately.

Figure 17:
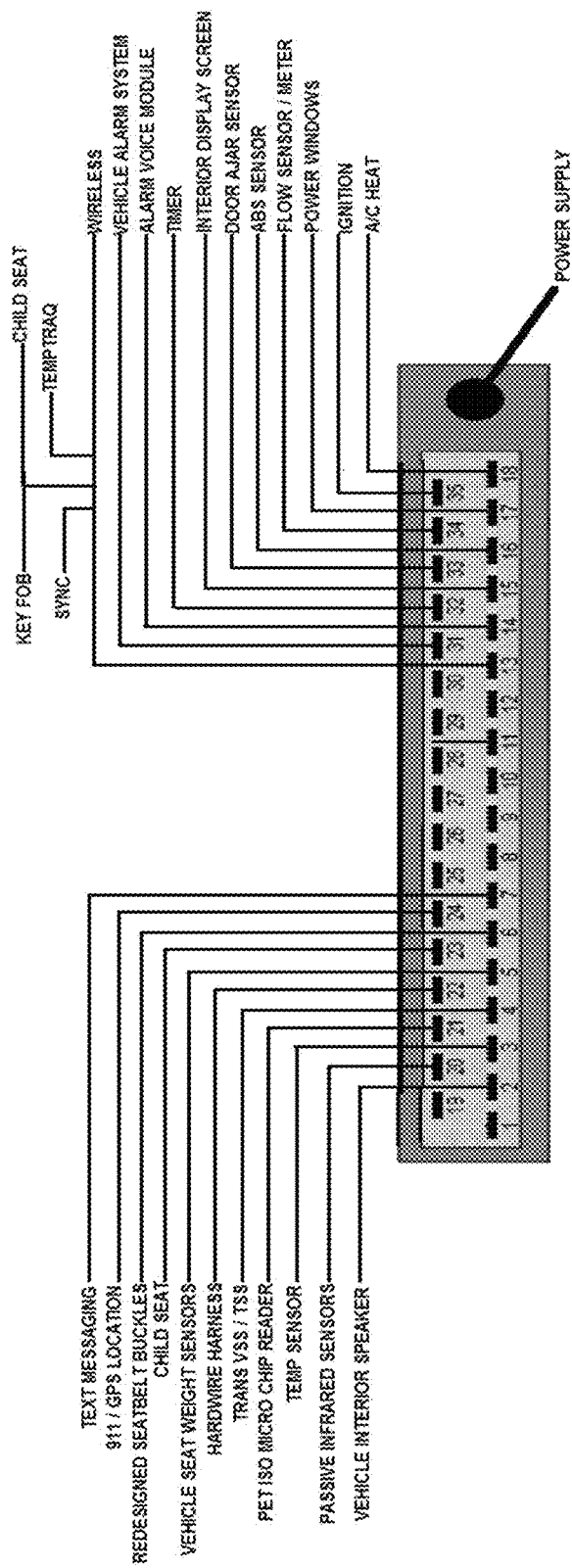
FIG. 17 is a schematic diagram of the ECM/ECU in the vehicle safety system, according to the present disclosure.

As shown in FIG. 17, the ECM/ECU includes a plurality of connections and power supply connections.

Figure 18:
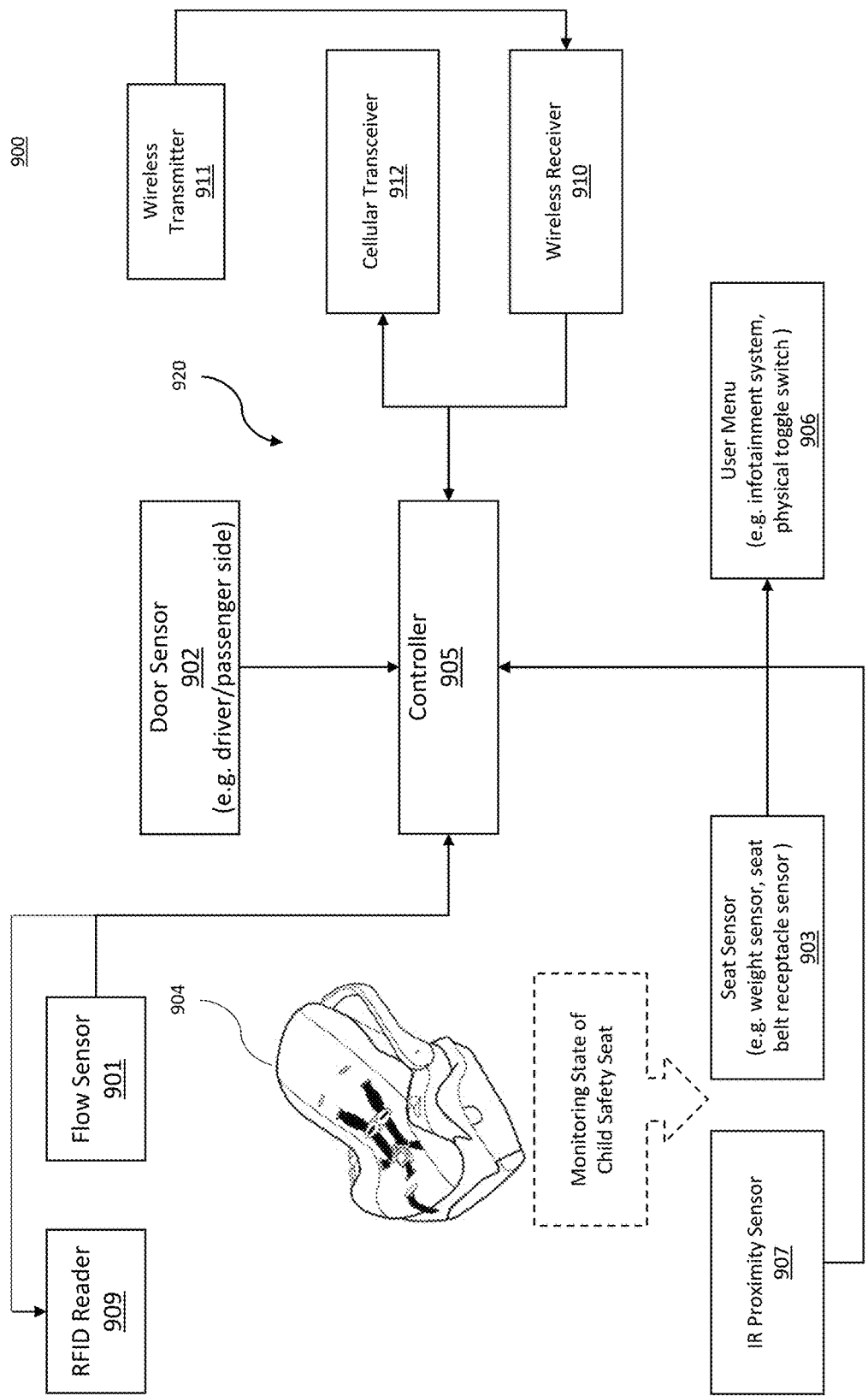
FIG. 18 is a schematic diagram of an example embodiment of the vehicle safety system, according to the present disclosure.

Referring now briefly to FIG. 18, a vehicle 900 with an example embodiment of a vehicle safety system 920 for preventing child abandonment is now described. It should be appreciated that any of the above described features can be incorporated into this embodiment.

The vehicle 900 illustratively comprises a flow sensor 901 for fuel in the vehicle, a driver side door sensor 902 coupled to a driver side door, at least one seat sensor 903 respectively associated with at least one child safety seat 904 within the vehicle, and a controller 905 coupled to the flow sensor and the at least one seat sensor. In some embodiments, the flow sensor 901 is within a fuel tank filler neck of the vehicle 900, and in other embodiments, the flow sensor may be located elsewhere.

Each seat sensor 903 may comprise a first weight sensor embedded in a seat of the vehicle 900, and a second sensor coupled to a seat belt buckle receptacle and configured to determine when the seat belt buckle receptacle is in a latched state. In some embodiments, the multi-sensor device is integrated into a single housing or package, but in other embodiments, the multiple sensors may be carried in separate housings.

The controller 905 is configured to detect when the vehicle 900 is in a fueling state based upon the flow sensor 901, detect occupancy of the at least one child safety seat 904 based upon the at least one seat sensor 903, and detect when the driver side door is in an open state based upon the driver side door sensor 902 in the vehicle. The controller 905 is configured to when receiving fueling user input from a user menu 906 within the vehicle 900. The fueling user input is indicative of a user of the vehicle 900 intending to fuel the vehicle. Since the vehicle safety system 920 monitors for potential abandoned children in the vehicle 900, the typical act of fueling may wrongly appear to be a hazardous scenario. To avoid unwanted alarms and annoyance to the user, the user generates the fueling user input to inform the vehicle safety system 920 of the fueling. Nevertheless, the vehicle safety system 920 stills monitors for potential abandonment, as described herein.

In the illustrated embodiment, the vehicle safety system 920 further comprises an RFID device reader 909 within the vehicle 900 and coupled to the controller 905. The controller 905 is configured to determine when an RFID tag associated with a pet is within the vehicle 900.

Once the controller 905 receives the fueling user input, the controller monitors (i.e. enters a monitoring state) for one or more of the following conditions: when the driver side door has entered the open state (i.e. driver has left the vehicle); when the at least one child safety seat 904 is occupied; and when the pet is detected within the vehicle 900. Once the conditions are detected, if the vehicle 900 does not enter the fueling state within a first time period (e.g. 3 minutes), the controller 905 then causes the vehicle to enter a first alert state, and if the vehicle does not enter the fueling state within a second time period (e.g. 4 minutes or 1 minute after the expiration of the first time period) greater than the first time period, then cause the vehicle 900 to enter a second alert state.

In particular, while in the first alert state, the controller 905 is configured to cause an audio output (e.g. one or more of vehicle horn, vehicle audio system, vehicle alarm siren) of the vehicle 900 to actuate periodically. In other words, the first alert state may comprise a chirping indicator state. When in the second alert state, the controller 905 is configured to cause an audio output of the vehicle 900 to actuate continuously.

Moreover, the vehicle safety system 920 illustratively includes at least one IR proximity sensor 907 in the vehicle 900 and coupled to the controller 905, and the controller is configured detect occupancy of the vehicle 904 based upon the at least one IR proximity sensor. In particular, the at least one IR proximity sensor 907 is configured to monitor when front driver and front passenger occupants leave the vehicle 900. The at least one IR proximity sensor 907 represents a redundant occupancy check for the at least one child safety seat 904.

The vehicle safety system 920 comprises a wireless receiver 910 coupled to the controller 905, and a wireless transmitter 911 (e.g. key fob remote device) in communication with the controller 905 via the wireless receiver. The controller 905 is configured to exit the first alert state or the second alert state based upon input received from the wireless transmitter 911.

The vehicle safety system 920 illustratively comprises a cellular transceiver 912 coupled to the controller 905, and the controller is configured to transmit an alert message via the cellular transceiver when in the second alert state. For drawing clarity, only one child safety seat 904, one seat sensor 903, one IR proximity detector 907, and one RFID reader 909 are shown, but it should be appreciated that the vehicle 900 may include respective pluralities of these devices.

Yet another aspect is directed to a method for installing a vehicle safety system 920 for preventing child abandonment in a vehicle 900. The method comprises positioning a flow sensor 901 within a fuel tank filler neck of the vehicle 900, positioning at least one seat sensor 903 respectively associated with at least one child safety seat 904 within the vehicle, and coupling a controller 905 to the flow sensor and the at least one seat sensor. The controller 905 is configured to detect when the vehicle 900 is in a fueling state based upon the flow sensor 901, detect occupancy of the at least one child safety seat 904 based upon the at least one seat sensor 903, and detect when a driver side door is in an open state based upon a driver side door sensor 902 in the vehicle. The controller 905 is configured to when receiving user input to enter the fueling state from a user menu 905 within the vehicle 900, when the driver side door has entered the open state, and when the at least one child safety seat 904 is occupied, if the vehicle does not enter the fueling state within a first time period, then cause the vehicle to enter a first alert state, and if the vehicle does not enter the fueling state within a second time period greater than the first time period, then cause the vehicle to enter a second alert state.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

The invention claimed is:

1. A vehicle safety system for preventing child abandonment in a vehicle, the vehicle safety system comprising:
    a flow sensor for fuel in the vehicle;
    a temperature sensor configured to generate a temperature value for an interior of the vehicle;
    at least one seat sensor respectively associated with at least one child safety seat within the vehicle; and
    a controller coupled to said flow sensor, said temperature sensor, and said at least one seat sensor, said controller configured to
        detect when the vehicle is in a fueling state based upon said flow sensor,
        detect occupancy of the at least one child safety seat based upon said at least one seat sensor,
        detect when a driver side door is in an open state based upon a driver side door sensor in the vehicle, and
        when the driver side door has entered the open state, when the at least one child safety seat is occupied, and when the vehicle does not enter the fueling state within a time period, then
            cause the vehicle to enter an alert state, and
            when in the alert state, cause an air conditioning device of the vehicle to activate.

2. The vehicle safety system of claim 1 wherein while in the alert state, said controller is configured to cause an audio output of the vehicle to actuate periodically.

3. The vehicle safety system of claim 1 wherein while in the alert state, said controller is configured to cause an audio output of the vehicle to actuate continuously.

4. The vehicle safety system of claim 1 further comprising a radio frequency identification (RFID) device reader within the vehicle and coupled to said controller; and wherein said controller is configured to determine when an RFID tag associated with a pet is within the vehicle.

5. The vehicle safety system of claim 4 wherein when the pet is detected within the vehicle, said controller is configured to
    if the vehicle does not enter the fueling state within the time period, then cause the vehicle to enter the alert state.

6. The vehicle safety system of claim 1 further comprising at least one infrared (IR) proximity sensor in the vehicle and coupled to said controller; and wherein said controller is configured detect occupancy of the vehicle based upon the at least one IR proximity sensor.

7. The vehicle safety system of claim 1 further comprising a wireless receiver coupled to said controller, and a wireless transmitter key fob remote device in communication with said controller via said wireless receiver; and wherein said controller is configured to exit the alert state based upon input received from said wireless transmitter key fob remote device.

8. The vehicle safety system of claim 1 further comprising a cellular transceiver coupled to said controller; and wherein said controller is configured to transmit an alert message via said cellular transceiver when in the alert state.

9. The vehicle safety system of claim 1 wherein each seat sensor comprises a first weight sensor embedded in a seat of the vehicle, and a second sensor coupled to a seat belt buckle receptacle and configured to determine when the seat belt buckle receptacle is in a latched state.

10. A vehicle with a vehicle safety system for preventing child abandonment in a vehicle, the vehicle comprising:
    a vehicle frame;
    a flow sensor carried by said vehicle frame and being for fuel in the vehicle;
    a temperature sensor carried by said vehicle frame and configured to generate a temperature value for an interior of the vehicle;
    at least one seat sensor respectively associated with at least one child safety seat within the vehicle; and
    a controller carried by said vehicle frame and coupled to said flow sensor, said temperature sensor, and said at least one seat sensor, said controller configured to
        detect when the vehicle is in a fueling state based upon said flow sensor, detect occupancy of the at least one child safety seat based upon said at least one seat sensor, detect when a driver side door is in an open state based upon a driver side door sensor in the vehicle, and when the driver side door has entered the open state, when the at least one child safety seat is occupied, and when the vehicle does not enter the fueling state within a time period, then cause the vehicle to enter an alert state, and when in the alert state, cause an air conditioning device of the vehicle to activate.

11. The vehicle of claim 10 wherein while in the alert state, said controller is configured to cause an audio output of the vehicle to actuate periodically.

12. The vehicle of claim 10 wherein while in the alert state, said controller is configured to cause an audio output of the vehicle to actuate continuously.

13. The vehicle of claim 10 further comprising a radio frequency identification (RFID) device reader within the vehicle and coupled to said controller; and wherein said controller is configured to determine when an RFID tag associated with a pet is within the vehicle.

14. The vehicle of claim 13 wherein when the pet is detected within the vehicle, said controller is configured to if the vehicle does not enter the fueling state within the time period, then cause the vehicle to enter the alert state.

15. The vehicle of claim 10 further comprising at least one infrared (IR) proximity sensor in the vehicle and coupled to said controller; and wherein said controller is configured detect occupancy of the vehicle based upon the at least one IR proximity sensor.

16. The vehicle of claim 10 further comprising a wireless receiver coupled to said controller, and a wireless transmitter key fob remote device in communication with said controller via said wireless receiver; and wherein said controller is configured to exit the alert state based upon input received from said wireless transmitter key fob remote device.

17. The vehicle of claim 10 further comprising a cellular transceiver coupled to said controller; and wherein said controller is configured to transmit an alert message via said cellular transceiver when in the alert state.

18. A method for installing a vehicle safety system for preventing child abandonment in a vehicle, the method comprising:

positioning a flow sensor for fuel in the vehicle;

positioning at least one seat sensor respectively associated with at least one child safety seat within the vehicle; and coupling a controller to the flow sensor and the at least one seat sensor, the controller configured to detect when the vehicle is in a fueling state based upon the flow sensor, detect occupancy of the at least one child safety seat based upon the at least one seat sensor, detect when a driver side door is in an open state based upon a driver side door sensor in the vehicle, and when the driver side door has entered the open state, when the at least one child safety seat is occupied, and when the vehicle does not enter the fueling state within a time period, then cause the vehicle to enter an alert state, and when in the alert state, cause an air conditioning device of the vehicle to activate.

19. The method of claim 18 wherein while in the alert state, the controller is configured to cause an audio output of the vehicle to actuate periodically.

20. The method of claim 18 wherein while in the alert state, the controller is configured to cause an audio output of the vehicle to actuate continuously.

* * * * *